US012795030B2

(12) United States Patent
Kamihisa

(10) Patent No.: US 12,795,030 B2
(45) Date of Patent: *Nov. 10, 2026

(54) TERMINAL DEVICE, SYSTEM, AND CONTROL METHOD

(71) Applicant: SHARP KABUSHIKI KAISHA, Sakai City (JP)

(72) Inventor: Sho Kamihisa, Sakai City (JP)

(73) Assignee: SHARP KABUSHIKI KAISHA, Sakai City (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/911,904

(22) Filed: Oct. 10, 2024

(65) Prior Publication Data

US 2025/0039321 A1 Jan. 30, 2025

Related U.S. Application Data

(63) Continuation of application No. 18/108,039, filed on Feb. 10, 2023, now Pat. No. 12,143,548, which is a (Continued)

(30) Foreign Application Priority Data

Jan. 6, 2021 (JP) ................................ 2021-001099

(51) Int. Cl.

*H04N 1/32* (2006.01)
*H04L 51/02* (2022.01)
*H04L 51/08* (2022.01)

(52) U.S. Cl.

CPC ......... *H04N 1/32128* (2013.01); *H04L 51/02* (2013.01); *H04L 51/08* (2013.01); *H04N 2201/3214* (2013.01)

(58) Field of Classification Search

CPC .......... H04N 1/00206; H04N 1/00209; H04N 1/00212; H04N 1/00244; H04N 1/32438; (Continued)

(56) References Cited

U.S. PATENT DOCUMENTS 8,335,797 B2 12/2012 Sakai
11,474,670 B2 10/2022 Tokuchi
(Continued)

FOREIGN PATENT DOCUMENTS

EP 1944684 B1 6/2018
JP 2000276414 A 10/2000
(Continued)

OTHER PUBLICATIONS

Notice of Allowance and Fee(s) Due issued on Nov. 17, 2022 for U.S. Appl. No. 17/561,163, which is the family application of the instant application.
(Continued)

*Primary Examiner* — Kent Yip
(74) *Attorney, Agent, or Firm* — ScienBiziP, P.C.

(57) ABSTRACT

A first terminal device includes a communicator capable of communicating with a server device which provides a service enabling message exchange among a plurality of terminal devices, a controller, and a display, wherein the controller displays, on the display, a message showing that a first communication device received a first image from the second communication device, receives an instruction for sending a second image to the second communication device, and, when failing to send the second image to the second communication device, sends, to the server device, an instruction for sending a reply message in response to having received the first image to the second terminal device.

2 Claims, 17 Drawing Sheets

Related U.S. Application Data continuation of application No. 17/561,163, filed on Dec. 23, 2021, now Pat. No. 11,616,893.

(58) Field of Classification Search
CPC ....... H04N 2201/3218; H04N 1/00307; H04N 1/32776; H04N 2201/0075
See application file for complete search history.

(56) References Cited

U.S. PATENT DOCUMENTS

| | | | | |
|---|---|---|---|---|
| 2007/0047006 | A1 | 3/2007 | Sakai | |
| 2011/0258540 | A1 | 10/2011 | Ueda et al. | |
| 2019/0079650 | A1 | 3/2019 | Tokuchi | |
| 2020/0387277 | A1 | 12/2020 | Tokuchi | |
| 2021/0092253 | A1 | 3/2021 | Ishida | |
| 2021/0099608 | A1 | 4/2021 | Kamihisa et al. | |
| 2021/0120144 | A1 * | 4/2021 | Takahashi | H04N 1/32128 |
| 2021/0160393 | A1 | 5/2021 | Sugita et al. | |

FOREIGN PATENT DOCUMENTS

| | | | |
|---|---|---|---|
| JP | 2007065926 | A | 3/2007 |
| JP | 2008-160531 | A | 7/2008 |
| JP | 2008171359 | A | 7/2008 |
| JP | 2019049901 | A | 3/2019 |

OTHER PUBLICATIONS

Non-Final Office Action issued on Oct. 5, 2023 for U.S. Appl. No. 18/108,039, which is the parent application of the instant application.
Final Office Action issued on Apr. 11, 2024 for U.S. Appl. No. 18/108,039, which is the parent application of the instant application.
Advisory Action issued on Jun. 21, 2024 for U.S. Appl. No. 18/108,039, which is the parent application of the instant application.
Notice of Allowance and Fee(s) Due issued on Jul. 22, 2024 for U.S. Appl. No. 18/108,039, which is the parent application of the instant application.

* cited by examiner

FIG. 3

| SOURCE CHAT APPLICATION ID | DESTINATION CHAT APPLICATION ID | SENDING DATE AND TIME | MESSAGE | FILE |
|---|---|---|---|---|
| CHATBOT | 0X00000001 | JULY 16, 2019 AT 12:20:39 | FAX RECEIVED··· | – |
| CHATBOT | 0X00000001 | JULY 16, 2019 AT 12:20:39 | SENDER:0345678912 NAME:CUBE_2019··· | CUBE_201907161220. pdf |
| CHATBOT | 0X00000001 | JULY 16, 2019 AT 12:20:59 | FAX SENDING NOT COMPLETED | – |
| ⋮ | ⋮ | ⋮ | ⋮ | ⋮ |

FIG. 4

| NAME | CHAT APPLICATION ID | TELEPHONE NUMBER | FAX NUMBER | ADDRESS |
|---|---|---|---|---|
| A | 0X00000001 | 00011112222 | 0012345678 | 198. 51. 100. 1 |
| B | 0X00000002 | 00033334444 | 0123456789 | – |
| C | 0X00000003 | 00055556666 | 0345678912 | – |
| ⋮ | ⋮ | ⋮ | ⋮ | ⋮ |

TERMINAL DEVICE, SYSTEM, AND CONTROL METHOD

CROSS-REFERENCE TO RELATED APPLICATION

This application is a continuation of U.S. patent application Ser. No. 18/108,039, filed on Feb. 10, 2023, which is a continuation of U.S. patent application Ser. No. 17/561,163, filed on Dec. 23, 2021, which claims priority from Japanese Application JP 2021-001099, filed on Jan. 6, 2021, the content of which is hereby incorporated by reference into this application.

BACKGROUND OF THE INVENTION

Field of the Invention

The present disclosure relates to a terminal device and the like.

Description of the Background Art

Conventionally, a facsimile machine, which is one of the image communication devices, has been widely used, and a technology for notifying of the receiving of a facsimile machine has been proposed.

For example, in an image forming device which creates a notification message that notifies of receiving of a facsimile and sends the message to a notification destination, there has been proposed a technology that includes, in the notification message, a URL (Uniform Resource Locator) for specifying a preview of a received image and a URL for displaying a screen for selecting a process for the received data (see, for example, Japanese Unexamined Patent Application No. 2008-160531).

In recent years, the use of applications, which send and receive messages between users, such as chat applications has become widespread. Therefore, it is desirable to be able to confirm, via the chat application, an image received via a facsimile communication, and to send, via the chat application, a reply image to the received image. Here, when a user instructs, from outside or the like via the chat application, a facsimile for reply, there may be a situation in which the user cannot easily confirm the state of the facsimile to which the reply is directed. When the sending of the reply image is delayed, the user cannot check the state of the facsimile, and the reply is delayed; accordingly, there is a problem of causing a possibility of developing into trouble. However, the above problem is not considered in the Japanese Unexamined Patent Application No. 2008-160531.

In view of the above problem, it is an object of the present disclosure to provide a terminal device and the like for posting, when an image could not be sent using the facsimile communication, a message including the image.

SUMMARY OF THE INVENTION

In order to solve the above-mentioned problems, a first embodiment of the present disclosure is a first terminal device including: a communicator capable of communicating with a server device which provides a service enabling message exchange among a plurality of terminal devices; a controller; and a display, wherein the controller: displays, on the display, a message showing that a first communication device received a first image from a second communication device, receives an instruction for sending a second image to the second communication device, and when failing to send the second image to the second communication device, sends, to the server device, an instruction for sending a reply message in response to having received the first image to the second terminal device.

A second embodiment of the present disclosure is a system including: a first communication device; a second communication device, a first terminal device, a second terminal device; and a server device, wherein the first terminal device receives, via the server device, that the first communication device received a first image from the second communication device, the first terminal device receives an instruction to the server device for sending a second image from the first communication device to the second communication device, the first terminal device receives, from the server device, that the first communication device cannot send the second image to the second communication device, and the first terminal device receives an instruction to the server device for sending a message to the second terminal device.

A third aspect of the present disclosure is a method of controlling a first terminal device that is capable of communicating with a server device which provides a service enabling message exchange among a plurality of terminal devices and that includes a display, the method including: displaying, on the display, a message showing that a first communication device received a first image from a second communication device, receiving an instruction for sending a second image to the second communication device, and when failing to send the second image to the second communication device, sending, to the server device, an instruction for sending a reply message in response to having received the first image to the second terminal device.

A fourth embodiment of the present disclosure is a method of controlling a system that includes a first communication device, a second communication device, a first terminal device, a second terminal device, and a server device, the method including: the first terminal device receiving, via the server device, a notification that the first communication device received a first image from the second communication device; the first terminal device receiving an instruction to the server device for sending a second image from the first communication device to the second communication device; the first terminal device receiving, from the server device, that the first communication device cannot send the second image to the second communication device; and the first terminal device receiving an instruction to the server device for sending a message to the second terminal device.

According to the present disclosure, it is possible to post, when an image could not be sent using a facsimile communication, a message including the image.

BRIEF DESCRIPTION OF THE DRAWINGS

FIG. 3 is a diagram for illustrating an example of a data structure of message information according to the first embodiment.

FIG. 4 is a diagram for illustrating an example of the data structure of an address information according to the first embodiment.

DESCRIPTION OF THE PREFERRED EMBODIMENTS

Figure 1:
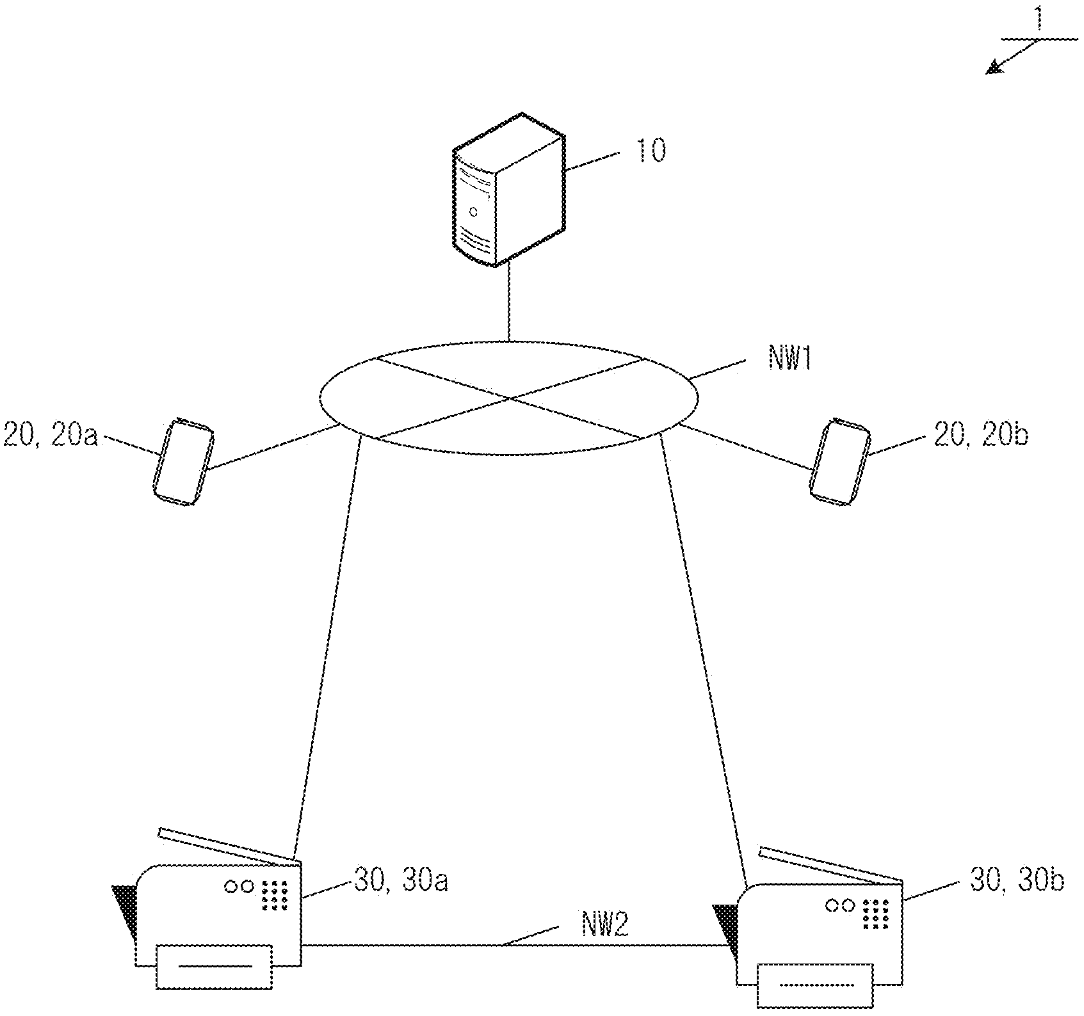
FIG. 1 is a diagram for illustrating an overall configuration of a system according to a first embodiment.

Referring to the drawings below, an embodiment for executing the present disclosure will be described. The following embodiments are examples for illustrating the present disclosure, and the technical scope of the invention described in the claims is not limited to the following description.

1. First Embodiment

1.1 Overall Configuration

FIG. 1 is a diagram for showing an overall configuration of a system 1 of the present disclosure. As shown in FIG. 1, the system 1 includes a server device 10, a terminal device 20, and an image communication device 30. The system 1 includes a plurality of terminal devices 20 (terminal device 20*a*, terminal device 20*b*) and a plurality of image communication devices 30 (image communication device 30*a*, image communication device 30*b*).

The server device 10, the terminal device 20, and the image communication device 30 are connected via a network NW1. The network NW1 is a network that connects each device. For example, the network NW1 is realized by LAN (Local Area Network) or WAN (Wide Area Network). The network NW1 may also be composed of a combination of these networks.

The image communication device 30 is a device having at least a facsimile (FAX/facsimile) function. The image communication device 30 may be mounted, for example, on an image formation device such as a digital multifunctional machine (MFP; Multi-Function Peripheral/Printer), or may be a stand-alone device. The image communication device 30 can also be connected to a telephone line network NW2, for example, an analog line or a digital line (ISDN).

The server device 10 is an information process device that provides a predetermined service (e.g., an IoT platform) and is installed, for example, on a cloud. According to the present embodiment, the server device 10 provides a chat service and a link service.

According to the present embodiment, the chat service refers to a service that realizes the function of exchanging messages between users who use the chat service. More specifically, the chat service is a service that realizes the exchange (sending and receiving) of messages between respective terminal devices (a plurality of terminal devices) used by respective users using the chat service.

According to the present embodiment, the link service refers to a service that links with the image communication device 30 thereby to realize a predetermined function using the image communication device 30.

The terminal device 20 is a device used by the user, and is an information process device including, for example, a mobile terminal such as a smartphone or a tablet, or a personal computer (PC).

In the present description, "receiving a fax," "receiving of a fax," and "fax receiving" refer to using the facsimile communication, and receiving an image based on a standard. Further, the terms "fax sending," "sending of a fax," and "fax sending" refer to using the facsimile communications, and sending images based on the standard. Facsimile communication is a telecommunication to send and receive images including characters and figures, etc., and a sending channel to be used for the facsimile communication is referred to as a facsimile communication network.

1.2 Functional Configuration

1.2.1 Server Device

Figure 2:
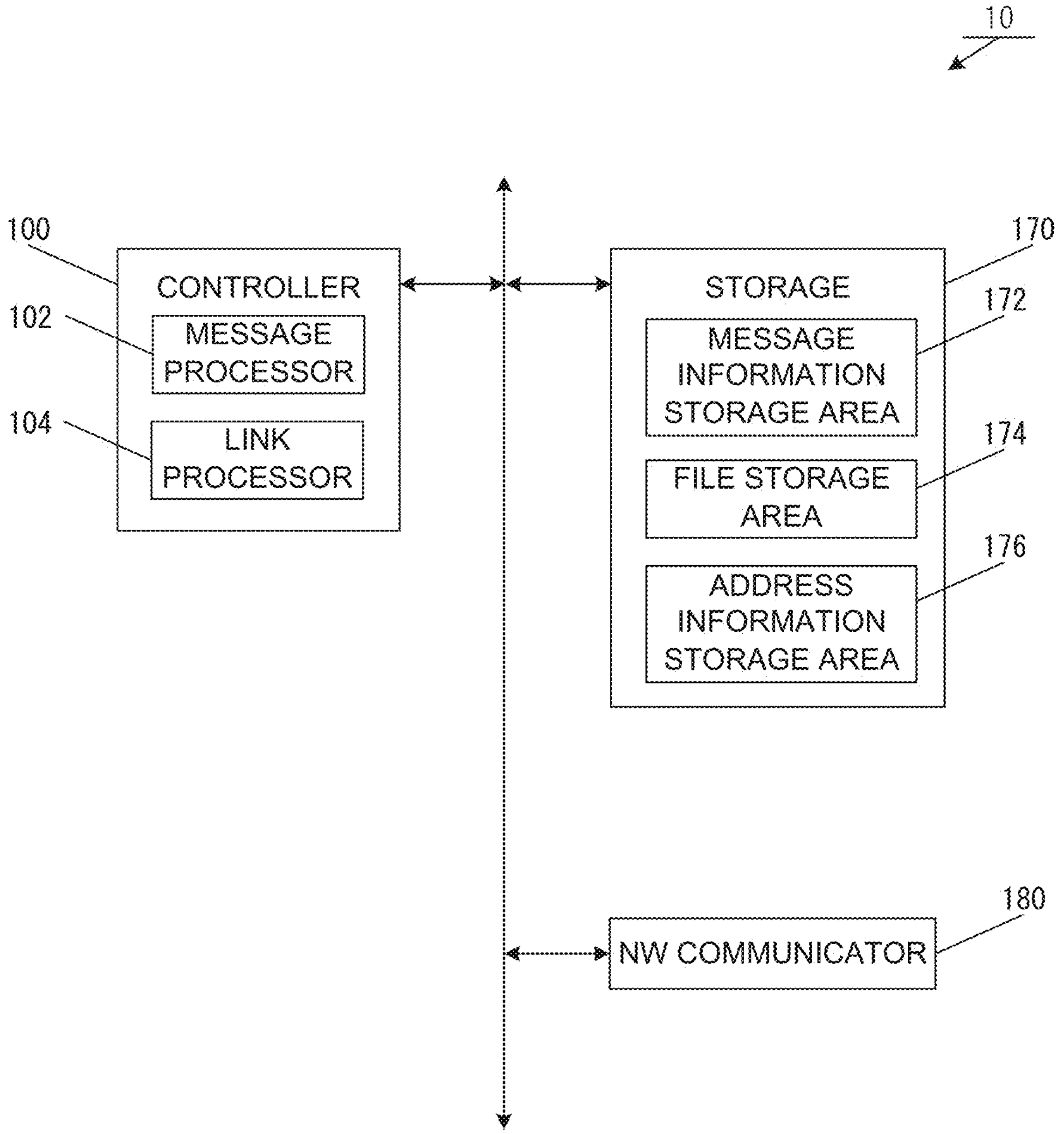
FIG. 2 is a diagram for illustrating a functional configuration of a server device according to the first embodiment.

Referring to FIG. 2, the functional configuration of the server device 10 of the present embodiment will be described. As shown in FIG. 2, the server device 10 includes a controller 100, a storage 170, and an NW communicator 180.

The controller 100 is a function for controlling the entire server device 10. The controller 100 reads out and executes various programs stored in the storage 170 thereby to execute various functions, and includes one or more computing devices (for example, CPUs (Central Processing Units)).

By executing a program, the controller 100 functions as a message processor 102 and a link processor 104.

The message processor 102 realizes the chat service. According to the present embodiment, the message processor 102 executes the following processes.

(1) Receiving and Storing of Posted Messages

The message processor 102 receives, via the NW communicator 180, information including a message input by the user (message information). According to the present embodiment, the process of sending the message information to the server device 10 is described as posting. According to the present embodiment, posting any message information that includes, as source information, a chat application ID of a user A, includes, as destination information, a chat application ID of a user B, and includes a predetermined message is described as posting the predetermined message from the user A to the user B.

The message information is information that includes the message and a message attribute. The message is a content (e.g., text data) input by the user. The message attribute is information about the message, such as the source information, the destination information, and the sending date and time.

In the message information, information that can uniquely identify the user using the chat service is stored as the source information and the destination information. According to the present embodiment, any information that can uniquely identify the user who uses the chat service is referred to as identification information.

The identification information may be information that is automatically given to the user in the chat service, or information that is set or changed by the user (e.g., service ID, user ID, account name, etc.).

The present embodiment is to be described based on that the chat application ID is used as identification information. The chat application ID is an ID inherent to the user, which ID is given to the user by the chat service (controller 100 of the server device 10) when the user using the chat service logs in to the chat service for the first time. The chat application ID may be, for example, a serial number such as "0X00000001", a random character string, or a character string or numeral calculated by a predetermined calculation method. Further, the chat application ID will not be changed by an operation of the user, nor will it be changed even when any other information (e.g., service ID, etc.) is set or changed by the user.

The identification information may be any information other than the chat application ID, provided that the identification information can uniquely identify the user who uses the chat service. For example, the identification information may be an ID (e.g., a service ID or user ID) that can be set by the user and is different for each user, or may be information that is inherent to the user (e.g., a telephone number or an e-mail address).

Further, a file can be attached to the message. The files are, for example, a PDF (Portable Document Format) file, an image file, an audio file, and a video file. The file may be included, for example, as part of the message, or may be included in the message information separately from the message. It may be allowed that, instead of including the file itself in the message or the message information, any information that identifies the file (e.g., a file name or a URL (Uniform Resource Locator)) is included in the message, and thereby the device that received the message can acquire the file based on the information that identifies the file.

When receiving the message information, the message processor 102 stores the received message information in a message information storage area 172. At this time, the message processor 102 may store the attached file in a file storage area 174, or may add predetermined information (e.g., the date and time of receiving) to the message information.

(2) Sending of Message

Based on the destination information, the message processor 102 sends the message information, thereby to send the message to the user as the destination of the message. The sending method may be a so-called PULL delivery or PUSH delivery.

In the case of executing the PULL delivery, for example, the message processor 102 receives, from another device via the NW communicator 180, a request for acquiring a message including the chat application ID which is identification information. At this time, the message processor 102 acquires, from the message information storage area 172, message information including the received chat application ID as the destination, and sends the acquired message information to the device that sent the request for acquiring the message.

When the PUSH delivery is to be executed, the information of the device corresponding to the chat application ID (e.g., serial number of or IMEI (International Mobile Equipment Identifier) of the device) is stored in the storage 170 in advance. Then, the message processor 102 acquires the information of the device that corresponds to the chat application ID included as the destination of the received message information, and sends the received message information to the device that corresponds to the information of the device.

Thus, by executing the processes of receiving, storing, and sending the message, the message processor 102 can send the message, which was sent by the user using the chat service, to the device used by the user of the destination of the message.

The link processor 104 realizes the link service. According to the present embodiment, the link processor 104 executes the following processes.

(1) A process of receiving information about an image (received image) received from the image communication device 30

(2) A process of posting a message about the received image from the image communication device 30 to the user (3) A process of receiving, from the user, any instruction for reply by facsimile (4) A process for instructing, based on user's instruction for reply by facsimile, the image communication device 30 for fax sending (5) A process for acquiring, from the image communication device 30, the result of executing the fax sending (6) A process of posting the message, which includes the execution result, from the image communication device 30 to the user According to the present embodiment, the image received by the image communication device 30 using the facsimile communication is referred to as a received image (first image). According to the present embodiment, reply means to send, to the sender of the received image, an image (second image) showing that the received image has been accepted. According to the present embodiment, the image sent at the time of reply is referred to as a reply image.

By executing the above processes, the link processor 104 realizes, with the user, an exchange using messages, thereby to make the server device 10 function as a so-called chatbot (Bot). Accordingly, the server device 10 can be the source or destination of messages in the chat service, and the chat application ID that corresponds to the server device 10 is given to the server device 10. According to the present embodiment, the chat application ID that corresponds to the server device 10 is described as "CHATBOT".

The storage 170 stores various programs and various data necessary for the operation of the server device 10. The storage 170 includes, for example, a storage device such as an SSD (Solid State Drive) which is a semiconductor storage, an HDD (Hard Disk Drive), or the like.

The storage 170 secures, as storage areas, the message information storage area 172, the file storage area 174 as an area for storing files, and an address information storage area 176.

The message information storage area 172 is an area for storing any message information. The message information includes, for example, as shown in FIG. 3, a source chat application ID (e.g., "CHATBOT") which is identification information of the user who sent the message, a destination chat application ID (e.g., "0X00000001") which is identification information of the user to whom the message is sent (destination), a sending date and time of the message (e.g., "12:20:39 on Jul. 16, 2019"), a message (e.g., "I received a fax . . . "), and information about a file attached to the message.

The information about the file attached to the message may be the file itself, or information showing the location of the file stored in the file storage area 174 (e.g., file path, file name, URL, etc.).

The address information storage area 176 stores contact of the user of the chat application, and information (address information) about the image communication device 30 used by the user. The address information includes, for example, as shown in FIG. 4, a name of a user (e.g., "A"); the chat application ID of the user (e.g., "0X00000001"); and a telephone number (e.g., "00011112222"), a fax number (e.g., "0012345678"), and an address (e.g., "198.51.100.1") of the image communication device 30 used by the user.

The address is the information used by the link processor 104 so as to communicate with the image communication device 30, and shows the location of the image communication device 30 in the network NW1. The present embodiment is to be described based on that an IP (Internet Protocol) address is stored as an address. Further, the address may store a MAC (Media Access Control) address, a port number, a server name, a domain name, or a combination of these pieces of information.

Via a LAN or WAN, the NW communicator 180 communicates with other devices such as the terminal device 20 and the image communication device 30. The NW communicator 180 includes, for example, a communication device such as NIC (Network Interface Card) used in a wired/wireless LAN, or a communication module.

1.2.2 Terminal Device

Figure 5:
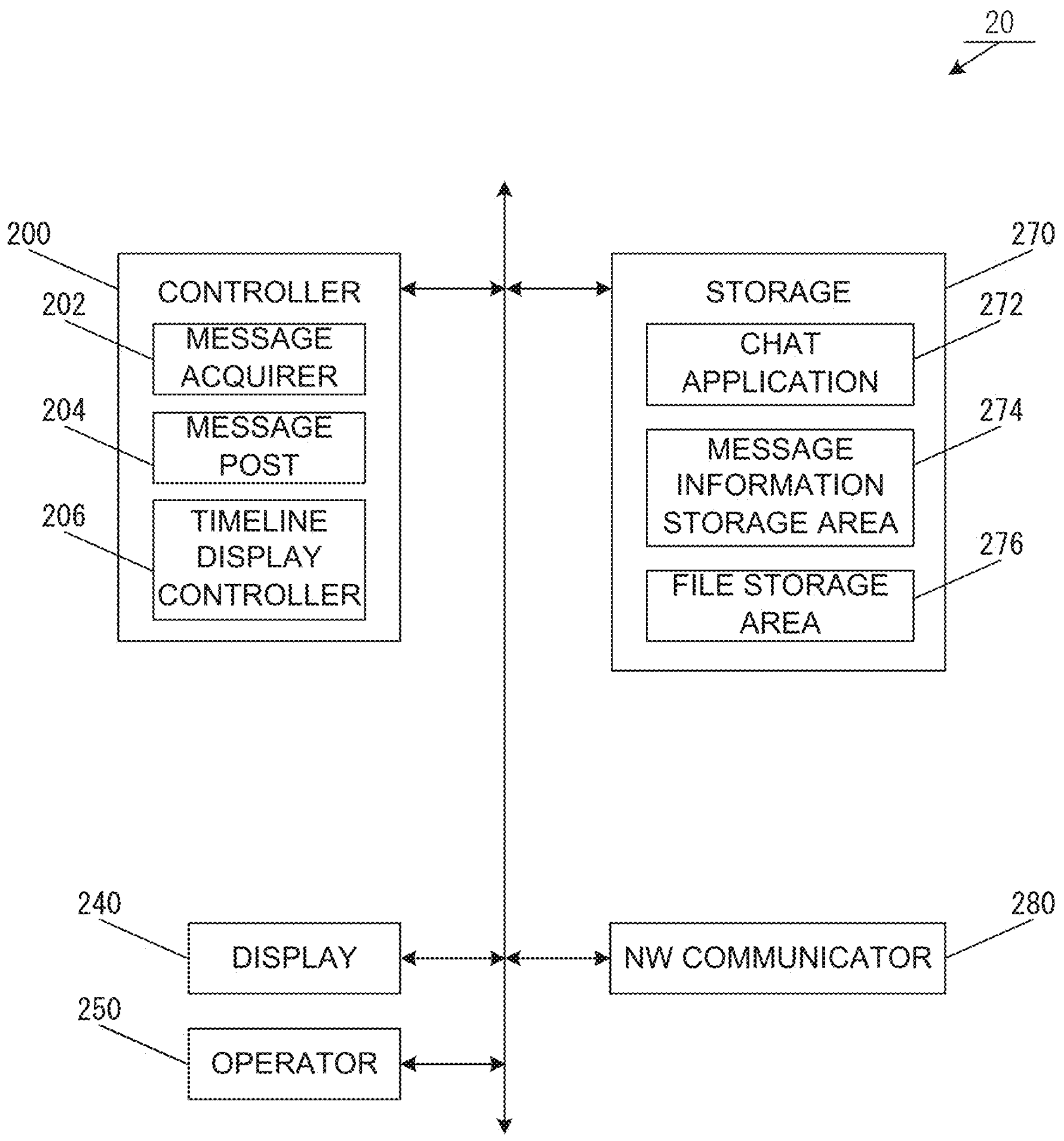
FIG. 5 is a diagram for illustrating a functional configuration of a terminal device according to the first embodiment.

With reference to FIG. 5, the functional configuration of the terminal device 20 of the present embodiment will be described. As shown in FIG. 5, the terminal device 20 includes a controller 200, a display 240, an operator 250, a storage 270, and an NW communicator 280.

The controller 200 is a function for controlling the entire terminal device 20. The controller 200 reads out and executes various programs stored in the storage 270 thereby to execute various functions, and includes one or more computing devices (for example, CPU).

The controller 200 executes a chat application 272 stored in the storage 270, thereby to functions as a message acquirer 202, a message post 204, and a timeline display controller 206.

The message acquirer 202 acquires the message from the server device 10. For example, via the NW communicator 280, the message acquirer 202 sends, to the server device 10, a request for acquiring the message. The request for acquiring the message includes, as identification information, the chat application ID of the user using the terminal device 20. Further, the message acquirer 202 receives the message information from the server device 10, as a response to the request for acquiring the message, and stores the received message information in the message information storage area 274.

Further, when the file is attached to the acquired message, the message acquirer 202 acquires the file and stores the file in the file storage area 276.

The message post 204 generates the message information including the message input by the user, and posts the message via the NW communicator 280 to the server device 10. Further, in the message information, the message post 204 includes, as the source information, the chat application ID of the user using the terminal device 20. Further, in the message information, the message post 204 includes, as the destination information, the chat application ID of the counterpart with whom the message is being exchanged. The counterpart with whom the message is being exchanged means, for example, a user who is other than the user operating the terminal device 20 and who is displayed on the timeline displayed by the timeline display controller 206. Further, the message post 204 stores the posted message information in the message information storage area 274, and stores, in the file storage area 276, the file attached to the posted message.

The timeline display controller 206 displays the timeline on the display 240. The timeline is a display mode in which messages are displayed in chronological order based on date information such as the date and time of sending. For example, from the message information storage area 274, the timeline display controller 206 reads out the message information in which the other user's chat application ID selected by the user is stored as the destination or the source. Then, the timeline display controller 206, based on the sending date and time, arranges the messages, which are included in the read-out message information, in chronological order, and displays the messages on the display 240. Together with the messages, the timeline display controller 206 may display the information showing the sender (e.g., the name of the sender), the date and time of sending, the file attached to the message, and the like.

The display 240 displays various pieces of information. The display 240 includes, for example, a display device such as an LCD (liquid crystal display), an organic EL (electroluminescence) panel, a micro LED (light emitting diode) display, and the like.

The operator 250 is a function for receiving the operation of the user using the terminal device 20, and includes an input device such as a touch sensor. The method for detecting an input with the touch sensor can be any general detection method, such as a resistive film method, an infrared method, an electromagnetic induction method, and a capacitance method. Further, the terminal device 20 may be provided with a touch screen in which a display 240 and the operator 250 are integrally formed. Further, as long as the user can input the information, the operator 250 may include various operation devices such as a mouse and a keyboard.

The storage 270 stores various programs and various data necessary for the operation of the terminal device 20. The storage 270 includes, for example, a storage device such as an SSD which is a semiconductor storage, an HDD, or the like.

The storage 270 stores the chat application 272, and further secures, as storage areas, a message information storage area 274 and a file storage area 276 which is an area for storing a file.

The chat application 272 is a program that causes the controller 200 to function as the message acquirer 202, the message post 204, and the timeline display controller 206. Further, the chat application 272 may be a program that causes the controller 200 to realize the general function executed when using the chat service. The general functions are, for example, a function for allowing the display 240 to display a screen including an area for displaying a timeline and an area for inputting postings, an address book function for managing the destination of the message, and a function for grouping users.

The message information storage area 274 stores the message information acquired by the message acquirer 202 and the message information posted by message post 204. The message information stored in the message information storage area 274 stores, for example, the information shown in FIG. 3.

Via the LAN or WAN, the NW communicator 280 communicates with other devices such as the server device 10 and the image communication device 30. Further, the NW communicator 280 uses, as communication methods, LAN as Ethernet (registered trademark), and LTE (Long Term Evolution)/4G/5G. Further, the NW communicator 280 includes, for example, NIC used in a wired/wireless LAN, and a communication module that can be connected to LTE/LTE-A (LTE-Advanced)/LAA (License-Assisted Access using LTE)/5G line.

1.2.3 Image Communication Device

Figure 6:
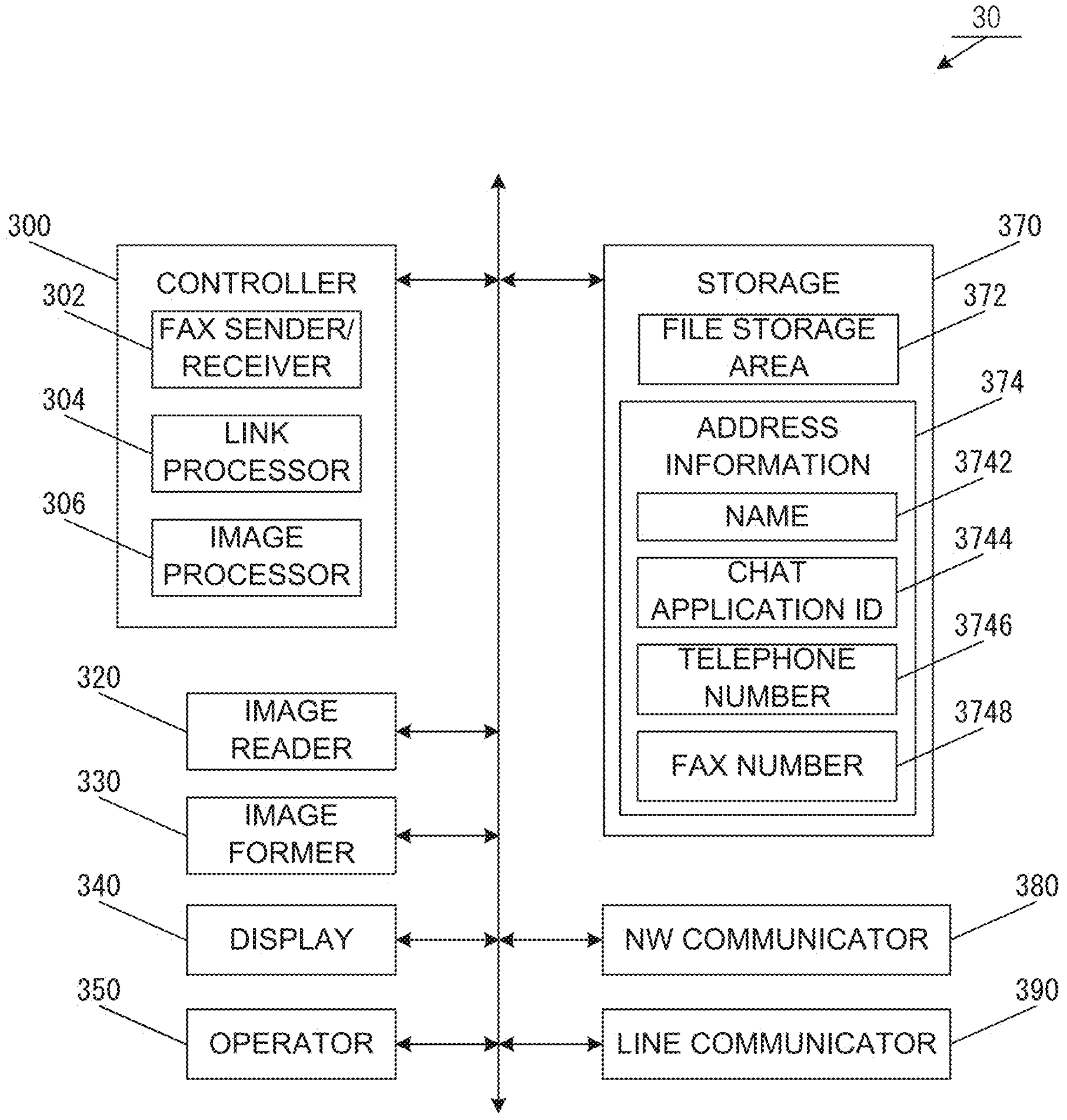
FIG. 6 is a diagram for illustrating a functional configuration of an image communication device according to the first embodiment.

Referring to FIG. 6, the functional configuration of the image communication device 30 of the present embodiment will be described. As shown in FIG. 6, the image communication device 30 includes a controller 300, an image reader 320, an image former 330, a display 340, an operator 350, a storage 370, an NW communicator 380, and a line communicator 390.

The controller 300 is a function for controlling the entire image communication device 30. The controller 300 reads and executes various programs stored in the storage 370 thereby to execute various functions, and includes one or more computing devices (for example, CPUs).

By executing the program stored in the storage 370, the controller 300 functions as a fax sender/receiver 302, a link processor 304, and an image processor 306.

The fax sender/receiver 302 executes fax sending and fax receiving. For example, the fax sender/receiver 302 sends the document image, which is read by the image reader 320, from the line communicator 390 to another device via a telephone line (network NW2). In the case of Internet FAX, the fax sender/receiver 302 sends the image from the NW communicator 380 to another device via a network such as the Internet (network NW1).

That is, the fax sender/receiver 302 executes the facsimile communication using the normal G3/G4 standard, etc., or the facsimile communication using Internet FAX, thereby to send/receive an image to/from the other device. The fax sender/receiver 302 may execute the facsimile communication using any known standard or protocol.

Via the NW communicator 380 or the line communicator 390, the fax sender/receiver 302 receives the image sent using the facsimile communication. The fax sender/receiver 302 stores, as a file, the received image (received image) in the file storage area 372.

The file stored in the file storage area 372 is, for example, a PDF file. Further, the file stored in the file storage area 372 may be a file in TIFF (Tagged Image File Format) format, JPEG (Joint Photographic Experts Group) format, or the like. When the fax sender/receiver 302 receives a plurality of images at once, a file in which each image is stored on a different page (a file composed of a plurality of pages) may be stored in the file storage area 372.

The link processor 304 executes any process related to the link service. For example, the link processor 304 executes the following processes.

(1) A process of sending the information of the received image to the server device 10

(2) A process of receiving an instruction, from the server device 10, for the fax sending, and of executing the fax sending (3) A process of sending, to the server device 10, the result of executing the fax sending The image processor 306 executes any process related to various images. For example, the image processor 306 executes a sharpening process and a gradation conversion process on the image read by the image reader 320.

The image reader 320 reads the document and stores, as an image file, the data of the read image. The image reader 320 includes, for example, a scanner device or the like provided with a device, which converts any optical information into an electrical signal, such as a CIS (Contact Image Sensor) or a CCD (Charge Coupled Device), and the image reader 320 reads the document loaded on a loading table of the image communication device 30. Further, in the file storage area 372, the image reader 320 stores, as an image file, the image data of the read image. Further, the image reader 320 may include an interface (terminal) for reading out the image stored in a USB storage.

The image former 330 forms (prints) an image on a recording medium. The image former 330 includes, for example, a laser printer or the like that uses an electrophotographic method.

The display 340 displays various pieces of information. The display 340 includes, for example, a display device such as an LCD, an organic EL panel, a micro LED display, and the like.

The operator 350 is a function for receiving the operation of the user who uses the image communication device 30, and includes an input device such as a touch sensor. The method for detecting an input with the touch sensor can be any general detection method, such as a resistive film method, an infrared method, an electromagnetic induction method, and a capacitance method. Further, the image communication device 30 may be provided with a touch screen in which the display 340 and the operator 350 are integrally formed.

The storage 370 stores various programs and various data necessary for the operation of the image communication device 30. The storage 370 includes, for example, a storage device such as an SSD which is a semiconductor storage, an HDD, or the like.

The storage 370 secures a file storage area 372 as a storage area. The storage 370 stores address information 374 which is information of the user who uses the image communication device 30.

In the file storage area 372, an image file of an image received by the fax sender/receiver 302 and an image file of a document read by the image reader 320 are stored.

The address information 374 is information about the user who uses the image communication device 30. According to the present embodiment, the storage 370 stores, as the address information 374, information such as a name 3742 of the user who uses the image communication device 30, a chat application ID 3744 that corresponds to the user, and a telephone number 3746 and fax number 3748 of the image communication device 30. The information stored as the address information 374 is set by the user who uses, for example, the image communication device 30.

Via the LAN or WAN, the NW communicator 380 communicates with other devices such as the server device 10 and the terminal device 20. The NW communicator 380 includes, for example, a communication device such as NIC used in the wired/wireless LAN, or the communication module.

The line communicator 390 is capable of communicating with the telephone line, and communicates with any other device via the telephone line. The line communicator 390 includes, for example, an interface (terminal) into which a cable for connecting to a telephone line can be plugged.

1.3 Process Flow

Next, the process executed by the devices included in the system 1 will be described with reference to FIGS. 7 to 9. The process flow will be described based on that the address information of the user who receives the image is stored in advance in the address information storage area 176.

1.3.1 Image Communication Device

Figure 7:
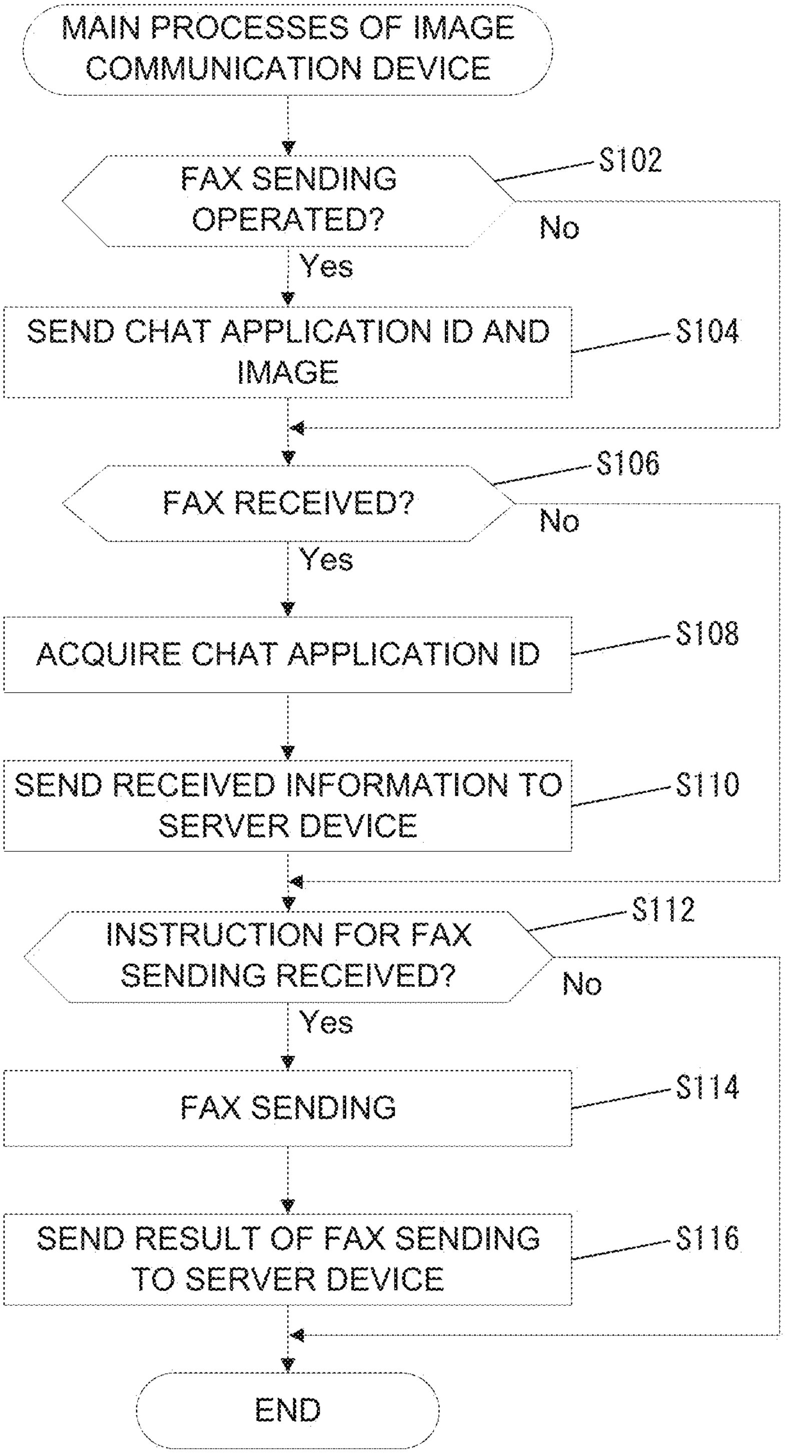
FIG. 7 is a flow chart for illustrating the flow of processes of the image communication device according to the first embodiment.

With reference to FIG. 7, the flow of processes of the image communication device 30 will be described. At first, when the operation of fax sending is executed by the user, the controller 300 (the fax sender/receiver 302), by using the facsimile communication, sends the chat application ID as the identification information, and the image selected by the user, to the destination specified by the user (step S102; Yes→step S104). That is, the fax sender/receiver 302 executes the process of fax sending.

Here, when a G3 protocol is used as the facsimile communication, the chat application ID is sent by being included in, for example, the sending terminal identification number (TSI: Sending Subscriber Identification). For example, so as to send the chat application ID, the fax sender/receiver 302 has read the chat application ID 3744 from the storage 370 before the fax sending. Then, in step S104, the fax sender/receiver 302 sends, via the network NW2, the signal, which includes the chat application ID 3744, to the image communication device 30 that is the destination of the image. Further, other than the chat application ID 3744, the fax sender/receiver 302 may send the name 3742, the telephone number 3746, and the fax number 3748, which are stored in the storage 370, to the image communication device 30 that is the destination of the image.

When the process of fax receiving is executed by the fax sender/receiver 302, the controller 300 acquires the chat application ID sent using the facsimile communication (step S106; Yes→step S108). For example, by decoding the signal received by the fax sender/receiver 302, the controller 300 acquires the chat application ID from the information sent as the sending terminal identification number. Further, the controller 300 may also acquire information such as the name, telephone number, and fax number of the user who sent the image.

Then, the controller 300 (the link processor 304) sends the received information to the server device 10 (step S110). The received information is information that shows that the fax receiving has been executed, and includes the following information.

(1) File of Received Image

The file of the received image is a file of the received image received by the fax sender/receiver 302 in step S106. Since the file of the received image is stored in the file storage area 372 when the fax is received by the fax sender/receiver 302, the link processor 304 can acquire the file by reading out the stored file.

(2) Information of the Image Communication Device 30 That Sent the Image

The information of the image communication device 30 that sent the image is the information received using the facsimile communication in step S106. For example, the link processor 304 includes, in the received information, the chat application ID acquired in step S108, as the information of the image communication device 30 that sent the image. In the received information, the link processor 304 may include the name, telephone number, and fax number of the image communication device 30 that sent the image.

Other than the above information, the link processor 304 includes, in the received information, a chat application ID, i.e., chat application ID 3744, of the user who uses the image communication device 30 that received the image.

Next, the controller 300 (the link processor 304) determines whether or not an instruction for fax sending is received from the server device 10 (step S112). According to the present embodiment, the instruction for fax sending includes the image to be sent using the facsimile communication and the information of the destination of the image.

When receiving the instruction for fax sending, the controller 300 (the link processor 304) fax-sends the image, which is included in the instruction for fax sending, to the destination shown by the information (e.g., a fax number) of the destination of the image included in the instruction for fax sending (step S112; Yes→step S114).

Next, the controller 300 (the link processor 304) acquires the result of fax sending in step S114, and sends the acquired result to the server device 10 (step S116).

For example, in the case where the process of fax sending in step S114 normally ends, the link processor 304 sends, to the server device 10, the information showing the successful completion, as a result of fax sending. Meanwhile, in the case where the process of fax sending in step S114 does not normally end, the link processor 304 sends, to the server device 10, the information showing an abnormal end, as a result of fax sending.

The case where the fax sending process does not normally end is a case where the fax sending job does not end even after a certain time or a case where the fax sending itself is impossible. The case where the fax sending job does not end even after the certain time elapses is, for example, a case where the fax sending or the fax receiving cannot be executed due to a large number of reservations made for the fax sending at the image communication device 30 at the source or the image communication device 30 at the destination, or due to some trouble caused. Further, the case where the fax sending itself is impossible is a case where the telephone line with the destination is busy, or a case where information showing error/busy end is received from the image communication device 30 at the destination.

That is, when the fax sending job stays for the certain time, the link processor 304 sends, to the server device 10, the information showing an abnormal end, as a result of fax sending. When the fax sending itself is impossible, the link processor 304, without waiting for the certain time to elapse, may send, to the server device 10, the information showing the abnormal end.

1.3.2 Server Device

Figure 8:
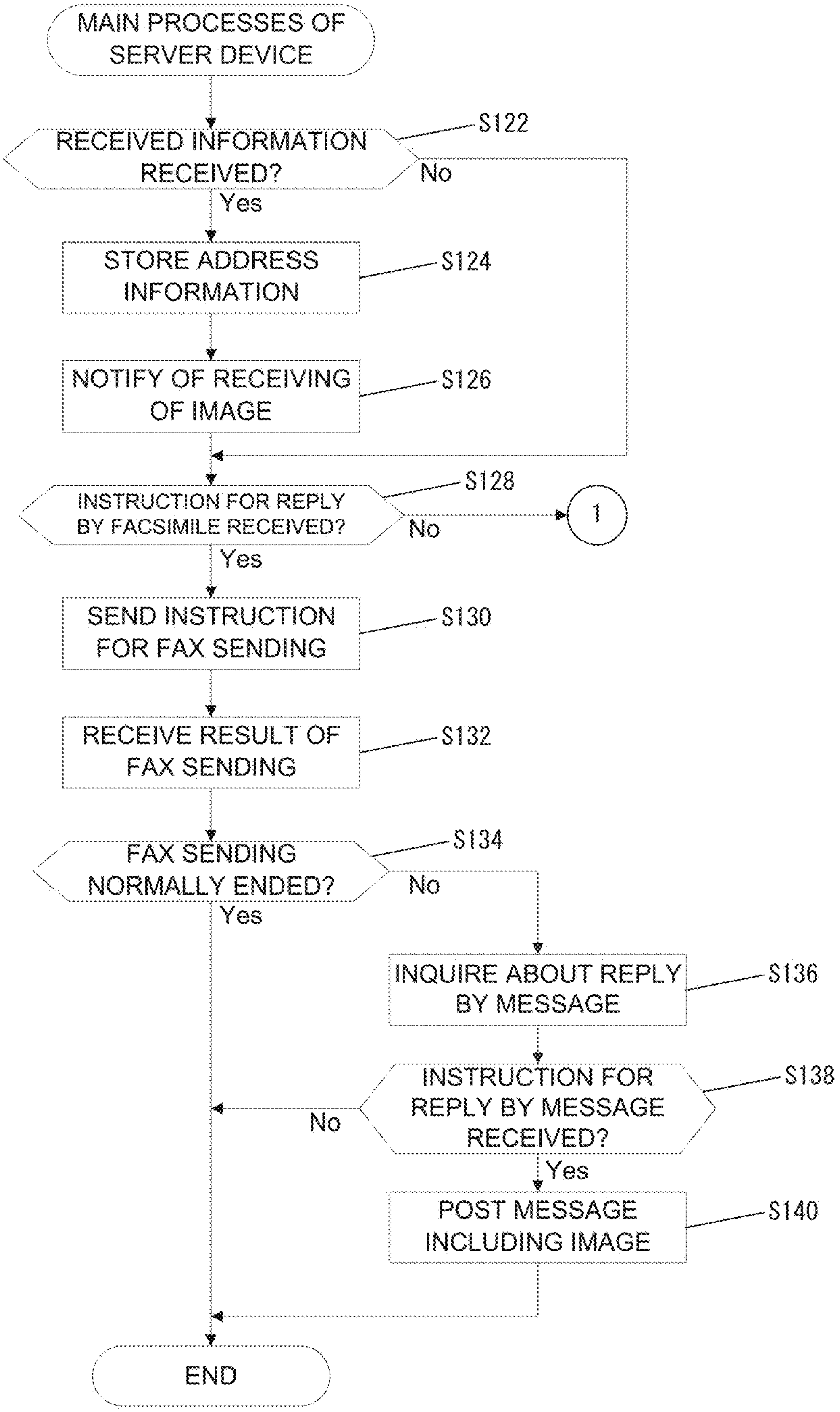
FIG. 8 is flow chart for illustrating the flow of processes of the server device according to the first embodiment.

With reference to FIG. 8, the flow of processes of the server device 10 will be described. At first, the controller 100 (the link processor 104) determines whether or not the received information has been received, via the NW communicator 180, from the image communication device 30 (step S122).

When receiving the received information, the controller 100 (the link processor 104) stores, in the address information storage area 176, the image communication device 30's information that is included in the received information and sent the image (step S122; Yes→step S124). When any information similar to the information of the image communication device 30 that sent the image is stored in the address information storage area 176, the link processor 104 may skip the process in step S124 or may update the similar information into the information included in the received information.

Then, the controller 100 (the link processor 104) notifies the user, who uses the image communication device 30 on which the fax receiving was executed, of the receiving of the image (step S126). For example, the link processor 104 executes the following processes.

(1) Storing of File

In the file storage area 174, the link processor 104 stores the file (file of the received image) included in the received information.

(2) Acquiring of Destination of Message

The link processor 104 acquires, from the received information, the chat application ID of the user who uses the image communication device 30 that received the image. This makes it possible for the link processor 104 to post the message that defines, as the destination, the user who uses the image communication device 30 that received the image.

(3) Generating and Posting of Message Information

The link processor 104 generates the message information that has a message in which the source is set to "CHATBOT", the destination is set to the chat application ID of the user who uses the image communication device 30 that received the image, and the file stored in (1) is attached. In the message, the link processor 104 may include the text showing that the image has been received and the text showing information of the received image (e.g., the name and fax number of the sender of the received image, file name, the file size, the number of pages of the received image, etc.). Further, the message may also include information for displaying a button for allowing the user to select whether or not to reply.

Further, the link processor 104 posts the generated message information. Here, according to the present embodiment, since the message information storage area 172 is secured in the storage 170, it is sufficient for the link processor 104 to store the generated message information in the message information storage area 172 instead of sending the generated message information to any other device.

The message information thus stored is acquired by the terminal device 20 that corresponds to the user who uses the image communication device 30 that received the image. With this, the user who uses the image communication device 30 that received the image can confirm, by viewing the terminal device 20, that the image has been received.

Next, the controller 100 (the link processor 104) determines whether or not an instruction for reply by facsimile is received, via the NW communicator 180, from the terminal device 20 (step S128). The instruction for reply by facsimile includes information that can identify the received image serving as the target of reply. The information that can identify the received image is, for example, information that identifies the message posted in step S126 (e.g., information that can identify a message such as the message ID) or information that identifies a file attached to the message posted in step S126 (e.g., a file name). Further, the instruction for reply by facsimile may be sent by message or sent by a predetermined command or API (Application Programming Interface).

When receiving, from the terminal device 20, the instruction for reply by facsimile, the controller 100 (link processor 104) sends, to the image communication device 30, an instruction for fax sending (step S128; Yes→step S130). Specifically, the link processor 104 executes the following processes.

(1) Generating of Reply Image

Based on the information that can identify the received image serving as the target of reply, the link processor 104 reads, from the file storage area 174, a file in which the received image serving as the target of reply is stored. Then, the link processor 104 generates a reply image based on the read file. The reply image is, for example, an image on the first page of the received image added by a text showing that the received image has been accepted.

(2) Acquiring of Destination of Reply Image

Based on the received information that is received in step S122 and includes the file of the received image serving as the target of reply, the link processor 104 acquires the destination of the reply image, i.e., the information (e.g., fax number) of the image communication device 30 which was used by the user in sending the received image. When the received information received in step S122 includes a fax number, the link processor 104 may acquire the fax number. When the received information received in step S122 includes the chat application ID of the user who sent the received image, the link processor 104 reads, from the address information storage area 176, the address information in which the chat application ID is stored. Then, the link processor 104 acquires the fax number stored in the read-out address information.

The link processor 104 may read, from the message information storage area 172, the message information of the message to which the received image identified from the information that can identify the received image serving as the target of reply is attached, and, based on the read message, may acquire the reply destination of the reply image. In this case, when the message stored in the read message information includes a fax number, the link processor 104 acquires the fax number as the destination of the reply image. When the message includes the name of the sender, the address information including the name of the sender may be read out from the address information storage area 176, and the fax number stored in the read-out address information may be acquired as the destination of the reply image.

(3) Acquiring of Destination of Instruction for Fax Sending

The link processor 104 reads, from the address information storage area 176, the address information in which the chat application ID acquired in step S126 is stored, and acquires the image communication device 30's address stored in the read-out address information. This identifies the image communication device 30 that is the destination of fax sending.

(4) Sending of Instruction for Fax Sending

To the image communication device 30 identified by the address acquired in (3), the link processor 104 sends, via the NW communicator 180, an instruction for fax sending including the information of the destinations of the reply image generated in (1) and the reply image acquired in (2).

By the process of step S114 shown in FIG. 7, the reply image included in the instruction for fax sending is sent by the fax sender/receiver 302 of the image communication device 30 to the image communication device 30 that is the destination of the reply image.

Next, from the image communication device 30, the controller 100 (the link processor 104) receives, via the NW communicator 180, the result of the fax sending that is based on the instruction for reply by facsimile sent in step S130 (step S132).

Then, the controller 100 (the link processor 104) determines whether or not the result of the fax sending received in step S132 is information showing a normal end (step S134).

When the result of the fax sending is not the normal end, the controller 100 (the link processor 104) posts, to the user who uses the image communication device 30 that received the image from the server device 10, a message for inquiring whether or not to reply by message (step S134; No→step S136). The message posted in step S136 may include information for displaying a button for allowing the user to select whether or not to reply by message. In step S136, similarly to step S126, the link processor 104 can generate message information including a message inquiring whether or not to reply by message, and may store the generated message information in the message information storage area 172.

Next, the controller 100 (link processor 104) determines whether or not the instruction for reply by message is received, via the NW communicator 180, from the terminal device 20 (step S138). Further, the instruction for reply by message may be sent by message or by a predetermined command or an API in the same manner as the instruction for reply by facsimile in step S128.

When receiving the instruction for reply by message, the controller 100 (link processor 104) posts a message (reply message), which includes the reply image, to the user who sent the received image from the server device 10 (step S138; Yes→step S140). For example, the link processor 104 executes the following processes.

(1) Generating of Reply Image

In a manner similar to the process in step S130, the link processor 104 reads out, from the file storage area 174, a file in which the received image serving as the target of reply is stored. Then, the link processor 104 reduces the image of the first page of the read-out file, thereby to generate the reply image. Further, the link processor 104 may use, as the reply image, an image in which the received image serving as the target of reply is superimposed with an image such as a character string or a stamp that shows the accepting.

(2) Acquiring of Destination of Message

From the received information received in step S122, the link processor 104 acquires the chat application ID of the user who sent the received image.

(3) Generating and Posting of Reply Message

With the chat application ID acquired in (2) as destination, the link processor 104 generates message information of a message (reply message) to which the reply image generated in (1) is attached, and stores (posts) the message information in (to) the message information storage area 172.

The message information stored in the message information storage area 172 by the above process is acquired by the terminal device 20 of the user who sent the received image. This allows the user, who sent the received image, to know, via the message, the received image and that the received image has been received (accepted) by the user at the destination.

In the case where the fax sending normally ends in step S134, the link processor 104 may post the message, which shows that the reply by facsimile is ended, to the user who sent, from the server device 10, the instruction for reply by facsimile (step S134; Yes).

1.3.3 Terminal Device

Figure 9:
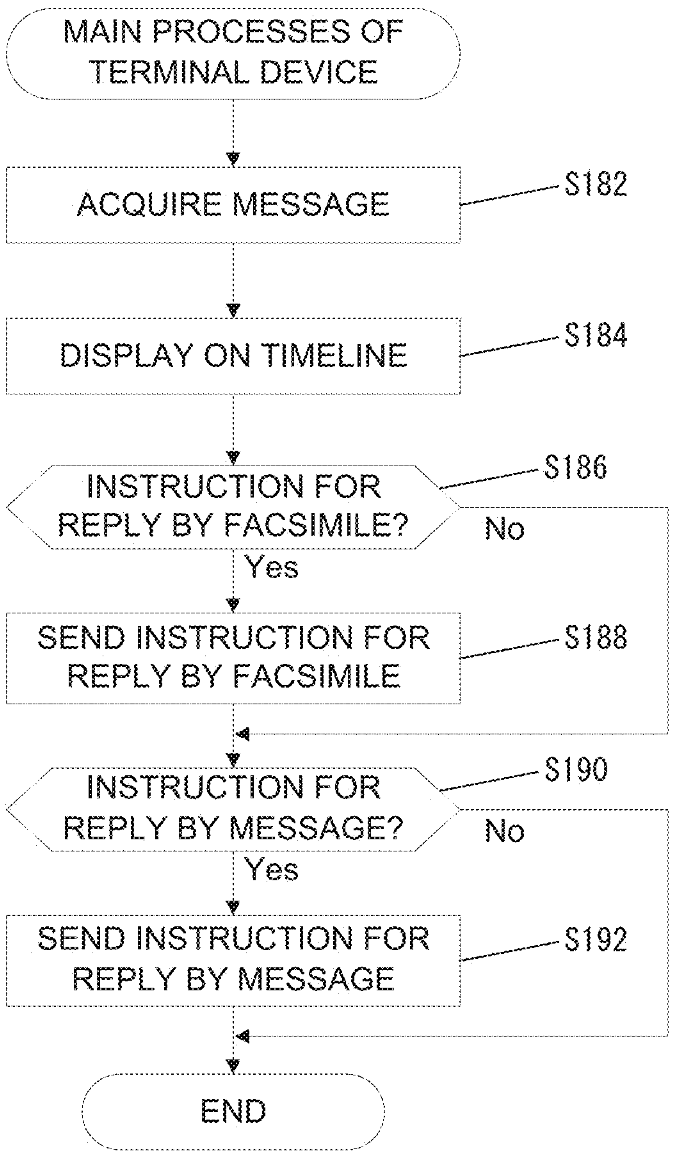
FIG. 9 is a flow chart for illustrating the flow of processes of the terminal device according to the first embodiment.

Referring to FIG. 9, the flow of processes of the terminal device 20 will be described. At first, the controller 200 (message acquirer 202) acquires a message (step S182). Further, the controller 200 (timeline display controller 206) displays the acquired message on the timeline (step S184). With this, the message posted by executing of the process of the server device 10 shown in FIG. 8 is displayed on the display 240.

The message displayed on the display 240 includes the following messages.

(1) Message to Notify of Receiving of Image

A message posted by executing of the process of step S126 in FIG. 8.

(2) Message Inquiring Whether or not to Reply by Message

A message posted by executing of the process of step S136 in FIG. 8.

(3) Message Including Reply Image

A reply message posted by executing of the process of step S140 in FIG. 8.

Of these, the messages shown in (1) and (2) are displayed on the terminal device 20 used by the user who received the received image (the first user). Meanwhile, the reply message shown in (3) is displayed on the terminal device 20 used by the user who sent the received image (the second user). The reply image attached to the reply message is displayed on the timeline by the timeline display controller 206.

Next, the controller 200 determines whether or not an instruction for reply by facsimile has been made by the user (step S186). For example, in step S184, the timeline display controller 206 displays, together with a message that notifies of the receiving of the image, a button which shows that a reply by facsimile is to be executed. At this time, when the button showing that the reply by facsimile is to be executed is selected, the controller 200 determines that an instruction for reply by facsimile has been made by the user.

When the instruction for reply by facsimile is made, the controller 200 sends, via the NW communicator 280 to the server device 10, the instruction for reply by facsimile (step S186; Yes→step S188). At this time, the controller 200 sends, to the server device 10, together with the instruction for reply by facsimile, information that can identify the received image serving as the target of reply (for example, the message ID, and the file name of the file attached to the message). When the reply by facsimile could not be executed, the server device 10 executes step S136 of the main process shown in FIG. 8, thereby to post a message inquiring whether or not to reply by message. In this case, in step S184, the timeline display controller 206 displays the button, which shows that the reply by message is to be executed, together with the message inquiring whether or not to execute the reply by message.

Next, the controller 200 determines whether or not the user has made an instruction for reply by message (step S190). For example, when the button showing the executing of the reply by message displayed on the timeline is selected, the controller 200 determines that the instruction for reply by message has been made by the user.

When the operation of reply by message is executed, the controller 200 sends, via the NW communicator 280 to the server device 10, the instruction for reply by message (step S190; Yes→step S192).

1.4 Operation Example

Figure 10:
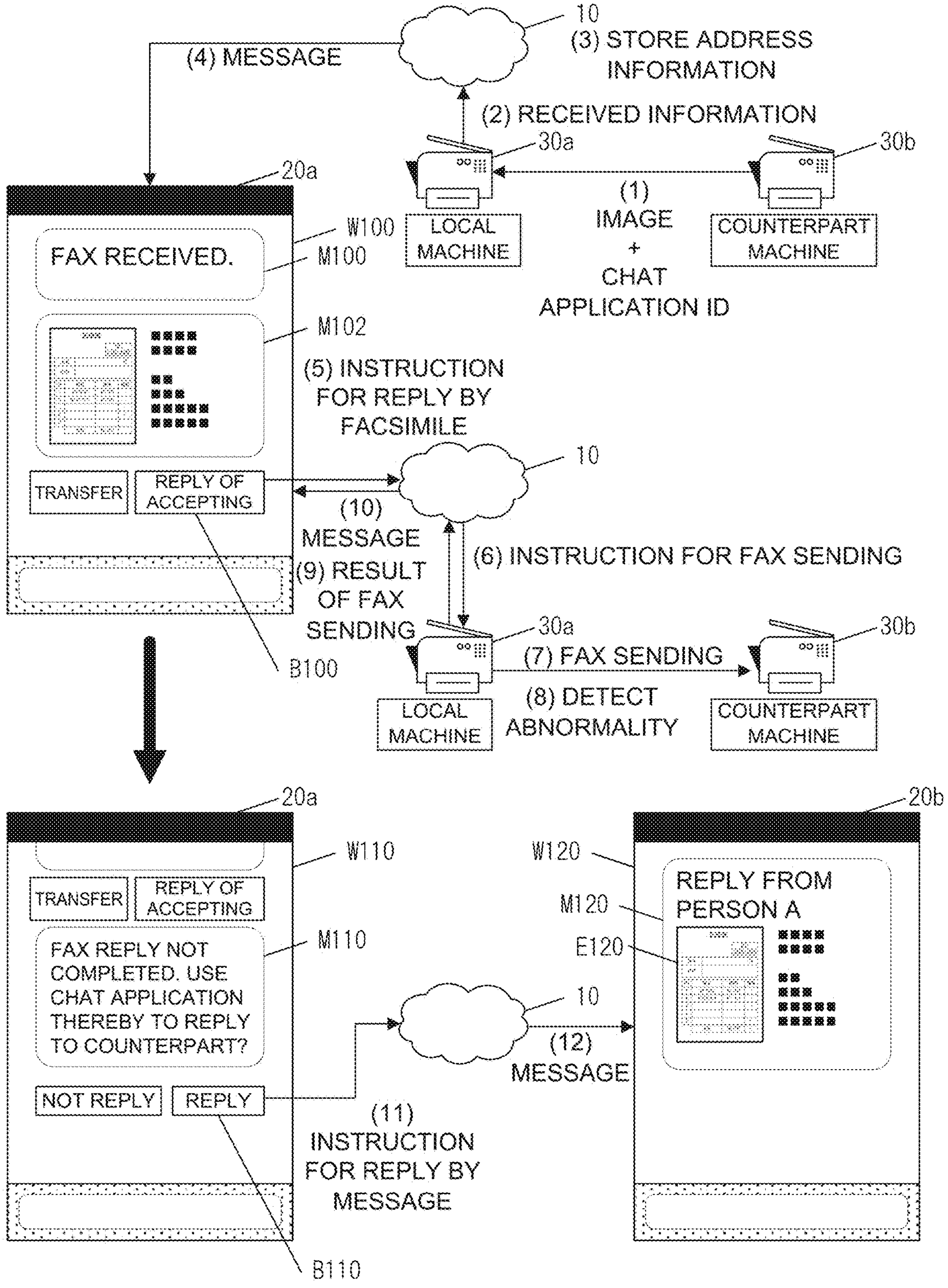
FIG. 10 is a diagram for illustrating an operation example according to the first embodiment.

An operation example of the present embodiment will be described with reference to FIG. 10. In the description of the operation example, the user who first sends the image is defined as the second user, and the user who receives the image is defined as the first user. An operation example is described below based on the order of the numbers described in FIG. 10.

(1) Sending of Image and Chat Application ID

First, using the image communication device 30*b* (the counterpart machine) which is a second communication device used by the second user, the second user sends an image to the first user. At this time, using the facsimile communication, the image communication device 30*b* used by the second user sends the read image's image data and the chat application ID to the image communication device 30*a* which is the first communication device used by the first user.

(2) Sending of Received Information

To the server device 10, the image communication device 30*a* (local machine) sends, as received information, the file of the received image, the chat application ID of the second user, and the chat application ID of the first user.

(3) Storing of Address Information

In the address information storage area 176, the server device 10 stores the address information including the second user's chat application ID included in the received information.

(4) Posting of Message

From the server device 10 to the first user, the server device 10 posts a message that notifies of receiving of the image. The terminal device 20*a* (the first terminal device) used by the first user acquires the message, and displays the message on the timeline.

To be described is about a display screen W100 in a case where a message showing a notification of receiving of an image is displayed on the timeline. As shown in the display screen W100 in FIG. 10, the timeline displays a message M100 notifying of the receiving of an image and a message M102 including the received image. Viewing the message M102, the user can confirm the received image. Further, a button for selecting whether or not to reply by facsimile is displayed below the message M102. By selecting a button B100 for reply by facsimile, the user can make an instruction for reply by facsimile to the received image.

(5) Sending of Instruction for Reply by Facsimile, and (6) Sending of Instruction for Fax Sending When the button B100 is selected, the terminal device 20*a* sends, to the server device 10, an instruction for reply by facsimile. To the image communication device 30*a* used by the first user, the server device 10 sends an instruction for fax sending. The instruction for fax sending includes the reply image.

(7) Fax Sending, (8) Abnormality Detection, (9) Sending of Sending Result

Based on the instruction for fax sending, the image communication device 30A fax-sends the reply image. When it is detected that the fax sending did not normally end, the image communication device 30*a* sends, to the server device 10, the information showing the abnormal end, as a result of fax sending.

(10) Posting of Message for Inquiring Whether or not to Reply by Message

From the server device 10 to the first user, the server device 10 posts a message inquiring whether or not to reply by message. The terminal device 20*a* used by the first user acquires the message, and displays the message on the timeline.

To be described is about a display screen W110 in the case where a message inquiring whether or not to reply by message is displayed on the timeline. As shown in the display screen W110 of FIG. 10, the timeline displays a message M110 which includes the fact that the reply by facsimile has not ended and also includes an inquiry whether or not to reply using the chat application (message). Viewing the message M110, the user can confirm that the reply by facsimile has not ended. Further, the message M110 displays a button for selecting whether or not to reply by message. Selecting the button B110 for reply by message, the user can make an instruction for reply by message.

(11) Sending of Instruction for Reply by Message

When the button B110 is selected, the terminal device 20*a* sends, to the server device 10, an instruction for reply by message.

(12) Posting of Message

Based on the instruction for reply by message, the server device 10 posts, from the server device 10 to the second user, a message including the reply image (reply message). The terminal device 20*b* (second terminal device) used by the second user acquires the reply message, and displays the reply message on the timeline.

To be described is about a display screen W120 displayed on the display 240 of the terminal device 20*b* used by the second user when the reply by message is instructed. As shown in the display screen W120 in FIG. 10, the timeline displays a message M120 including a reply image E120. Viewing the message M120, the second user can confirm that the image has been received by the first user.

According to the present embodiment, although it has been described that the server device 10 generates the reply image, the terminal device 20 or the image communication device 30 may also generate the image. The device that generates the reply image may be determined, for example, according to the capability of each device, the content of the service provided by the server device 10, and the capability of the chat application.

For example, in the case where the terminal device 20 generates the reply image, in step S188 of FIG. 9, when sending, to the server device 10, an instruction for reply by facsimile, the controller 200 generates the reply image based on the file attached to the message notifying of the receiving of the image. Then, including the generated reply image in the instruction for reply by facsimile, the controller 200 may send the generated reply image to the server device 10. In this case, when executing the process of step S192 in FIG. 9, the controller 200 may send, to the server device 10, the reply image, which was generated in step S188, together with the instruction for reply by message.

In the case where the terminal device 20 generates the reply image, when the user instructs the terminal device 20 to reply by message, the terminal device 20 may post a message with the user, who sent the received image, as a destination. Specifically, in step S126, the server device 10 sends, to the terminal device 20, also the chat application ID included in the received information received in step S122. The chat application ID may be sent from the server device 10 to the terminal device 20, either in a state of being included in the message or separate from the message. When the instruction for reply by message is made from the user, the terminal device 20 posts the reply message. Specifically, the chat application ID received from the server device 10 is used as the destination, and the chat application ID of the user using the terminal device 20 is used as the source; then, the message information of the message to which the reply image is attached is sent to the server device 10. In this way as well, the message to which the reply image is attached is received by the terminal device 20 used by the user who sent the received image, and the reply image is displayed by the terminal device 20.

In the case where the image communication device 30 generates the reply image, in step S130 of FIG. 8, the link processor 104 of the server device 10 includes, in the instruction for fax sending, information that can identify the received image serving as the target of reply, and sends the above information. In step S114, the link processor 304 of the image communication device 30 reads, from the file storage area 372, the file that corresponds to the information that can identify the received image. Then, based on the read-out image, the link processor 304 may generate the reply image.

According to the present embodiment, the server device 10 is described as providing the chat service and the link service, but the chat service and the link service may be executed by a separate server, or may be executed as separate services respectively. For example, the provider of the system 1 may provide only the link service, and the chat service may use the existing service. Even in this case, the link processor 104, in the chat service, behaves as a chatbot. Therefore, via the chat service, the instruction from the user can be received via the message between the terminal device 20 and the server device 10.

According to the present embodiment, it has been described that the image communication device, which is the second communication device, sends the chat application ID together with the image, and that the chat application ID of the user who sent the image is acquired by the image communication device which is the first communication device that received the image. However, any other method may be used to acquire the chat application ID of the user who sent the image. For example, the terminal device 20 may store an address book in which chat application IDs, names, telephone numbers, and fax numbers of other users are registered, and the address information stored in the server device 10 may be linked to the address book stored in the terminal device 20. In this case, the server device 10 may identify the corresponding chat application ID from the name and fax number of the user who sent the image. Further, the registered information of the chat application (e.g., chat application ID, name, fax number, etc.) may be stored in advance as address information, and the server device 10 may identify the corresponding chat application ID from the name and fax number of the user who sent the image.

According to the present embodiment, it has been described as inquiring the user whether or not to reply by message or not when the reply by fax could not be executed, but the process of automatically executing without inquiring the user whether or not to reply by message or not may be executed.

According to the present embodiment, although it has been described as having the link processor 304 in the image communication device 30, a separate device (link device) capable of executing the process executed by the link processor 304 may be prepared, without having the link processor 304 in the image communication device 30.

In this case, the image communication device 30 communicates with the link device, and realizes a process similar to the process described according to the present embodiment. For example, when receiving the image, the image communication device 30 sends, to the link device, information of the received image. To the server device 10, the link device sends the received information that is based on the received image. When receiving, from the server device 10, an instruction for reply by facsimile, the link device, based on the instruction for reply by facsimile, may control the image communication device 30 thereby to execute the fax sending, and may acquire, from the image communication device 30, the result of fax sending.

According to the present embodiment, when having executed, via the chat application, the instruction for fax reply, the user can send a reply by message even when a trouble such as the job being held up for a certain time is occurring on the image communication device side. Thus, in the case where the fax reply is instructed for from the chat application, a reply showing that the image has been received can be sent to the chat application at the counterpart when the certain time in which the fax sending job is not ended for some reason has elapsed.

2. Second Embodiment

Next, a second embodiment will be described. Being different from the first embodiment, the second embodiment is an embodiment in which the image communication device is provided with a function for acquiring and posting the message. According to the present embodiment, FIG. 2 of the first embodiment is replaced with FIG. 11, FIG. 6 of the first embodiment is replaced with FIG. 12, and FIG. 7 of the first embodiment is replaced with FIG. 13, respectively. The same numeral and symbol are given to the same functional portion and process, and description thereof will be omitted.

Figure 11:
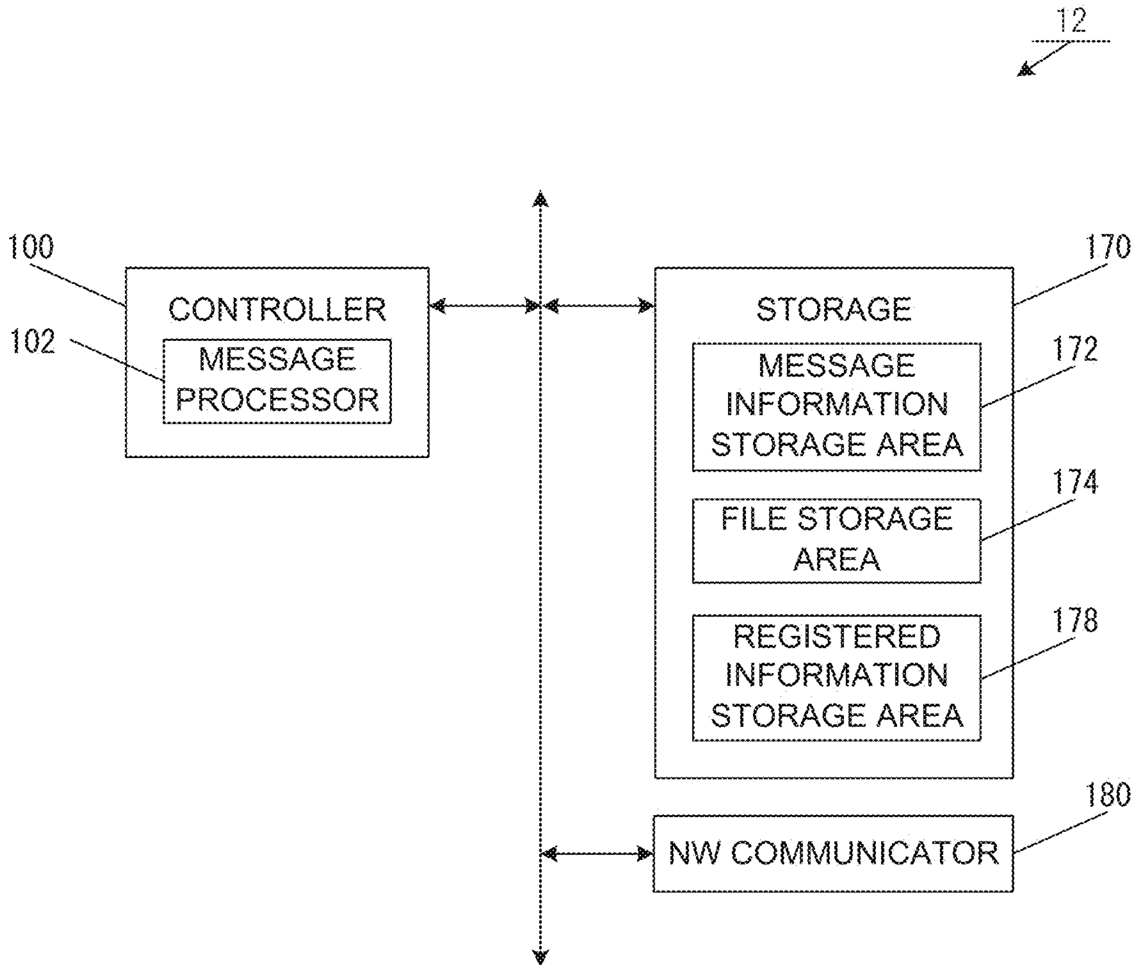
FIG. 11 is a diagram for illustrating the functional configuration of a server device according to the second embodiment.
Figure 12:
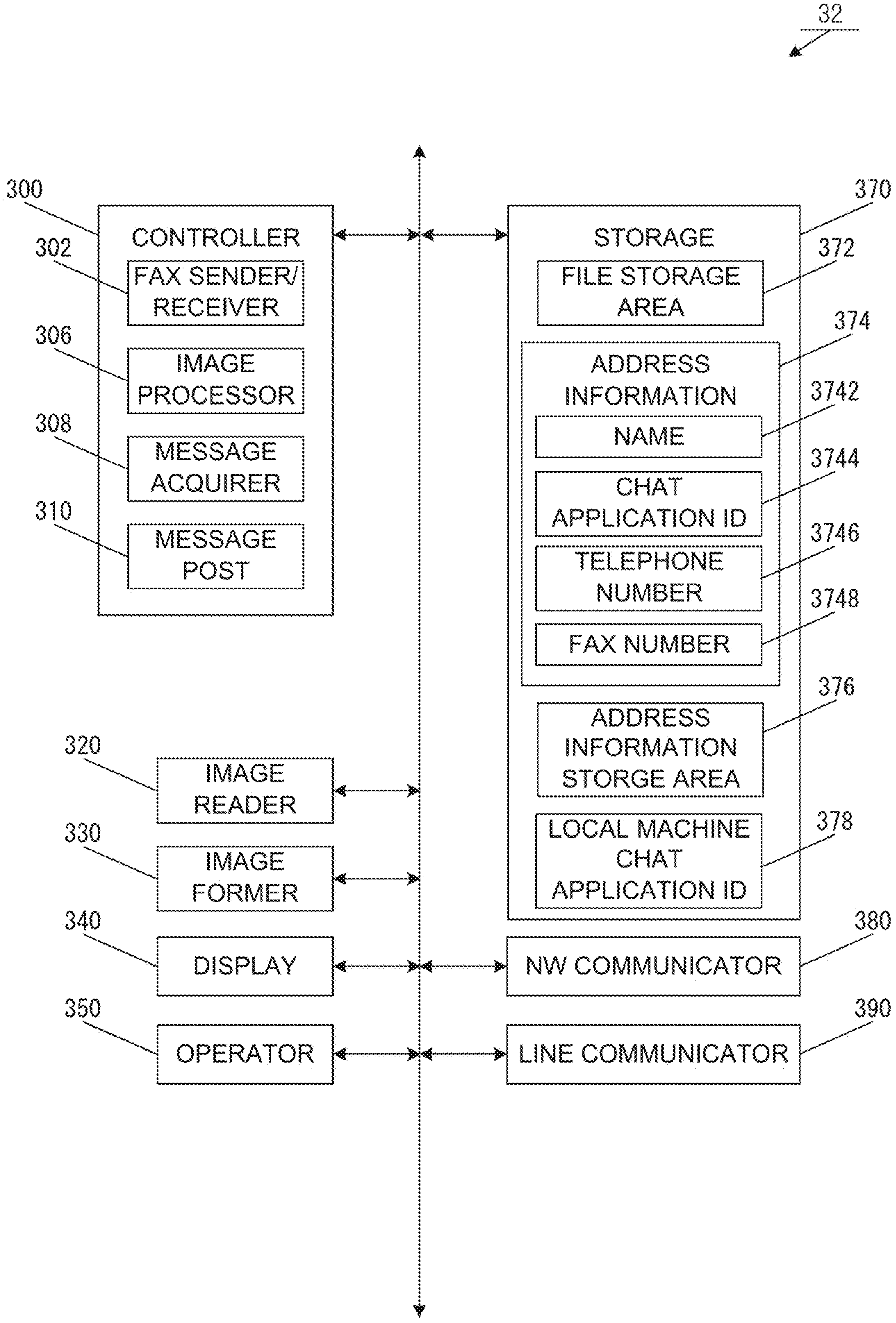
FIG. 12 is a diagram for illustrating the functional configuration of an image communication device according to the second embodiment.

In the system according to the present embodiment, in the system 1 shown in FIG. 1, the server device 10 is replaced with a server device 12 shown in FIG. 11, and the image communication device 30 is replaced with an image communication device 32 shown in FIG. 12.

Referring to FIG. 11, the functional configuration of the server device 12 according to the present embodiment will be described. The server device 12 differs from the server device 10 in that the controller 100 does not include the link processor 104. Further, the storage 170 securely has a registered information storage area 178 for storing registered information which is the chat application ID of the user of the chat service, and information about the user (e.g., the user's attribute information such as a user name, and authentication information such as an account name and a password). That is, the server device 12 of the present embodiment provides only the chat service.

Referring to FIG. 12, the functional configuration of the image communication device 32 according to the present embodiment will be described. The image communication device 32 differs from the image communication device 30 in that the controller 300 is further provided with a message acquirer 308 and a message post 310. Further, an address information storage area 376 is secured in the storage 370, and a local machine chat application ID 378 is stored in the storage 370.

Also, according to the present embodiment, the image communication device 32 behaves as a chat bot (Bot). Accordingly, in the image communication device 32, the chat application ID for exchanging messages with the image communication device 32 is preset and is stored as the local machine chat application ID 378.

From the server device 12 via the NW communicator 380, the message acquirer 308 acquires a message with the image communication device 32 as a destination. The message acquirer 308 executes the same process as the message acquirer 202.

The message post 310 generates any message information that includes a message for the user who uses the image communication device 32, and posts the generated message information via the NW communicator 380.

The flow of the processes according to the present embodiment is described below. According to the present embodiment, the flow of processes of the terminal device 20 is the same as that of FIG. 9 according to the first embodiment. Further, the server device 12 executes the process executed by message processor 102 described according to the first embodiment.

Next, referring to FIG. 13, the flow of processes of the image communication device 32 according to the present embodiment will be described. According to the present embodiment, when the process of fax receiving is executed by the fax sender/receiver 302 in step S106, the controller 300 stores the address information (step S106; Yes→step S202). For example, the controller 300 stores, in the address information storage area 376, the address information including information, which was sent by the facsimile communication, such as a name, a chat application ID, a fax number, and a telephone number.

Then, the controller 300 notifies the user, who uses the image communication device 30 on which the fax receiving was executed, of the receiving of the image (step S204). For example, from the image communication device 30 to the user of the image communication device 30, the message post 310 posts a message to which a file of the received image received in step S106 is attached.

When receiving, from the terminal device 20, an instruction for reply by facsimile, the controller 300 executes the fax sending based on the received instruction for reply by facsimile (step S206; Yes→step S208). For example, based on the information which is included in the instruction for reply by facsimile and which can identify the received image serving as the target of reply, the controller 300 reads, from the file storage area 372, the received image which is included in the instruction for reply by facsimile and which serves as the target of reply. Then, based on the read-out image data, the controller 300 generates the reply image. Based on the information which was acquired in step S106 and which is held by the image communication device 30 that sent the received image, the destination information of the reply image is acquired. Based on the destination information of the reply image, the fax sender/receiver 302 fax-sends the reply image.

Then, the controller 300 determines whether or not the fax sending has been normally ended (step S210). When the fax sending is not normally ended, the controller 300 (message post 310) posts, from the image communication device 30 to the user of the image communication device 30, a message for inquiring the user about reply by message (step S210; No→step S212).

Next, the controller 300 determines whether or not an instruction for reply by message is received from the terminal device 20 (step S214). When receiving the instruction for reply by message, the controller 300 (message post 310) posts a message including the reply image (step S214; Yes→step S216). For example, the message post 310 generates the reply image based on the received image read out in step S208. Further, the message post 310 acquires the chat application ID received in step S106, i.e., the chat application ID of the user who sent the received image. To the user who sent the received image from the image communication device 30, the message post 310 posts the message including the reply image.

By the above processes, the user who received the image, even when the reply image could not be sent by the facsimile communication, can send, to the user who sent the image, the message including the reply image that is based on the received image.

According to the present embodiment, when receiving the image by the facsimile communication, the user, by using the existing chat service, can reply by message.

3. Third Embodiment

Next, a third embodiment will be described. The third embodiment is an embodiment that allows the user, who, in the chat application, makes a reply of accepting, to select whether or not to reply using the chat application. Although the present embodiment can be applied to any of the first and second embodiments, the case of applying to the first embodiment will be described. In the description of the present embodiment, the user who received the received image is defined as the first user, and the user who sent the received image is defined as the second user.

According to the present embodiment, when receiving the instruction for reply by facsimile in step S128 in FIG. 8, the controller 100 determines whether or not the chat application ID of the second user is stored in the address information storage area 176. According to the present embodiment, the controller 100 does not send, to the image communication device 30, the instruction for fax sending even when receiving the instruction for reply by facsimile, but sends, to the image communication device 30, the instruction for fax sending when receiving the instruction for the after-described executing of a reply by facsimile.

When the chat application ID of the second user is stored, the controller 100 (the link processor 104) posts, from the server device 10 to the first user, the message that allows the first user to select a reply method of either executing a reply by facsimile or executing a reply by message.

Via the NW communicator 280 to the server device 10, the controller 200 of the terminal device 20 sends the information showing the reply method selected by the first user. Specifically, when the user selects the reply by facsimile, the controller 200 sends, to the server device 10, an instruction for executing the reply by facsimile. Meanwhile, when the user selects the reply by message, the controller 200 sends, to the server device 10, an instruction for reply by message.

When receiving, from the terminal device 20, the instruction for executing the reply by facsimile, the controller 100 (link processor 104) executes the process of sending, to the image communication device 30, the instruction for fax sending (step S130 in FIG. 8). Meanwhile, when receiving, from the terminal device 20, the instruction for reply by message, the controller 100 (link processor 104) executes the process of posting, from the server device 10 to the second user, the message including the reply image (step S140 in FIG. 8).

By executing the above processes, the first user can select whether to reply, by facsimile or by message, to the second user who can reply by message.

When the chat application ID of the second user is not stored, for example, the controller 100 (the link processor

104) can post, from the server device 10 to the first user, a message inquiring whether or not to reply by facsimile.

Figure 14:
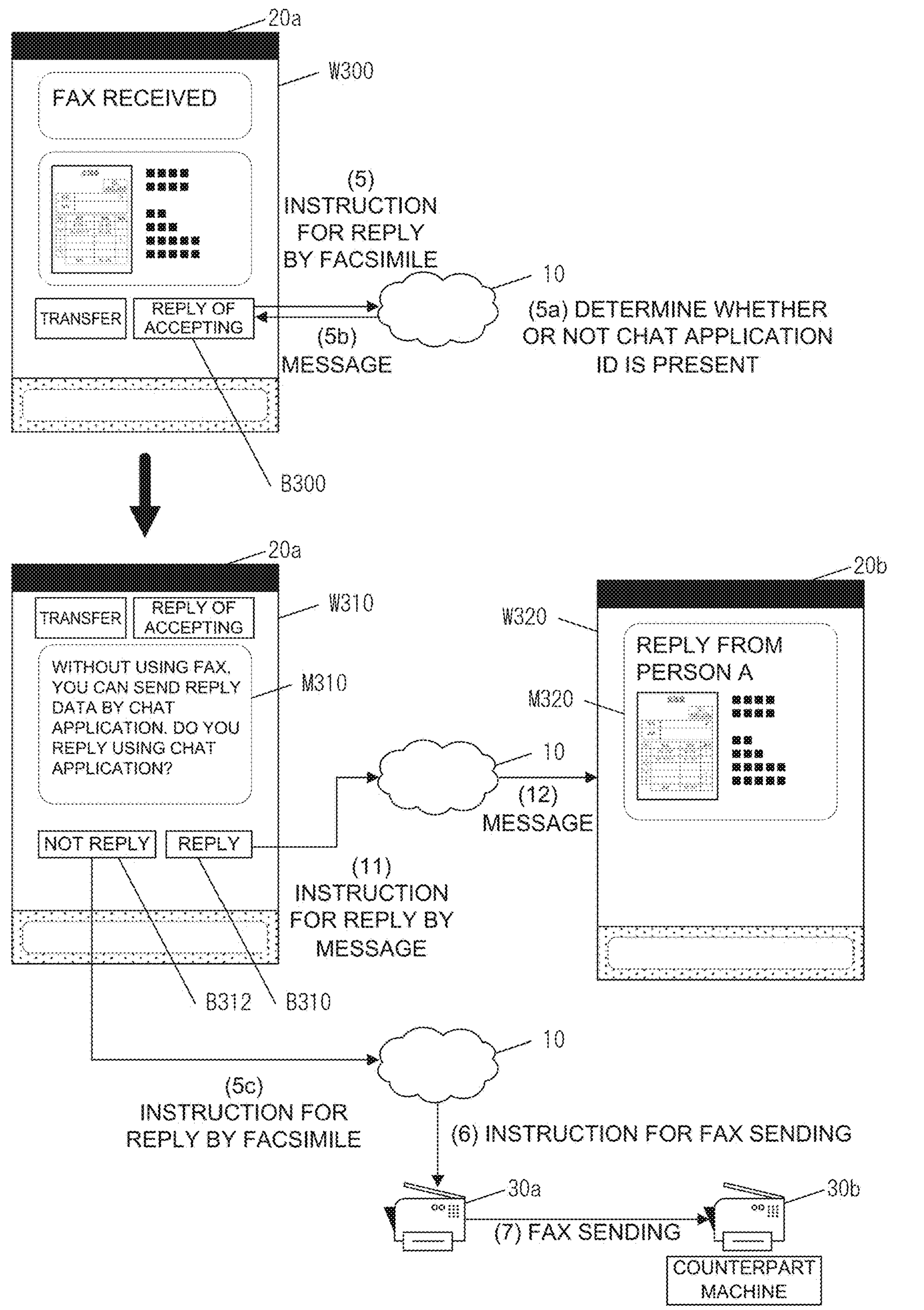
FIG. 14 is a diagram showing an operation example according to a third embodiment.

With reference to FIG. 14, an operation example according to the present embodiment will be described. A display screen W300 shown in FIG. 14 is a diagram showing a timeline displayed on the terminal device 20*a* used by the first user. The display screen W300 of FIG. 14 is the same as the display screen W100 shown in FIG. 10.

When a button B300 for reply by facsimile is selected by the user, an instruction for reply by facsimile is sent from the terminal device 20*a* to the server device 10 ((5) in FIG. 14). The server device 10 determines whether or not the chat application ID of the second user is stored in the address information storage area 176 ((5*a*) of FIG. 14), and posts a message that is based on the determination ((5*b*) of FIG. 14).

In the case where the chat application ID of the second user is stored in the server device 10, when the button B300 for reply by facsimile is selected by the first user, a display screen W310 is displayed showing a timeline including a message M310 for selecting the reply method.

The user can select either a button B310 to reply by message or a button B312 to make an instruction for reply by facsimile.

When the button B310 for reply by message is selected by the user, an instruction for reply by message is sent from the terminal device 20*a* to the server device 10 ((11) in FIG. 14). With this, the message including the reply image is sent from the server device 10 to the second user ((12) of FIG. 14).

When the button B312 which instructs to reply by facsimile is selected by the user, an instruction for reply by facsimile is sent from the terminal device 20*a* to the server device 10 ((5*c*) in FIG. 14). Based on the instruction for executing the reply by facsimile, the server device 10 sends, to the image communication device 30*a*, a request for the fax sending ((6) of FIG. 14). This allows the image communication device 30*a* to send, by using the facsimile communication, the reply image to the image communication device 30*b*.

Figure 13:
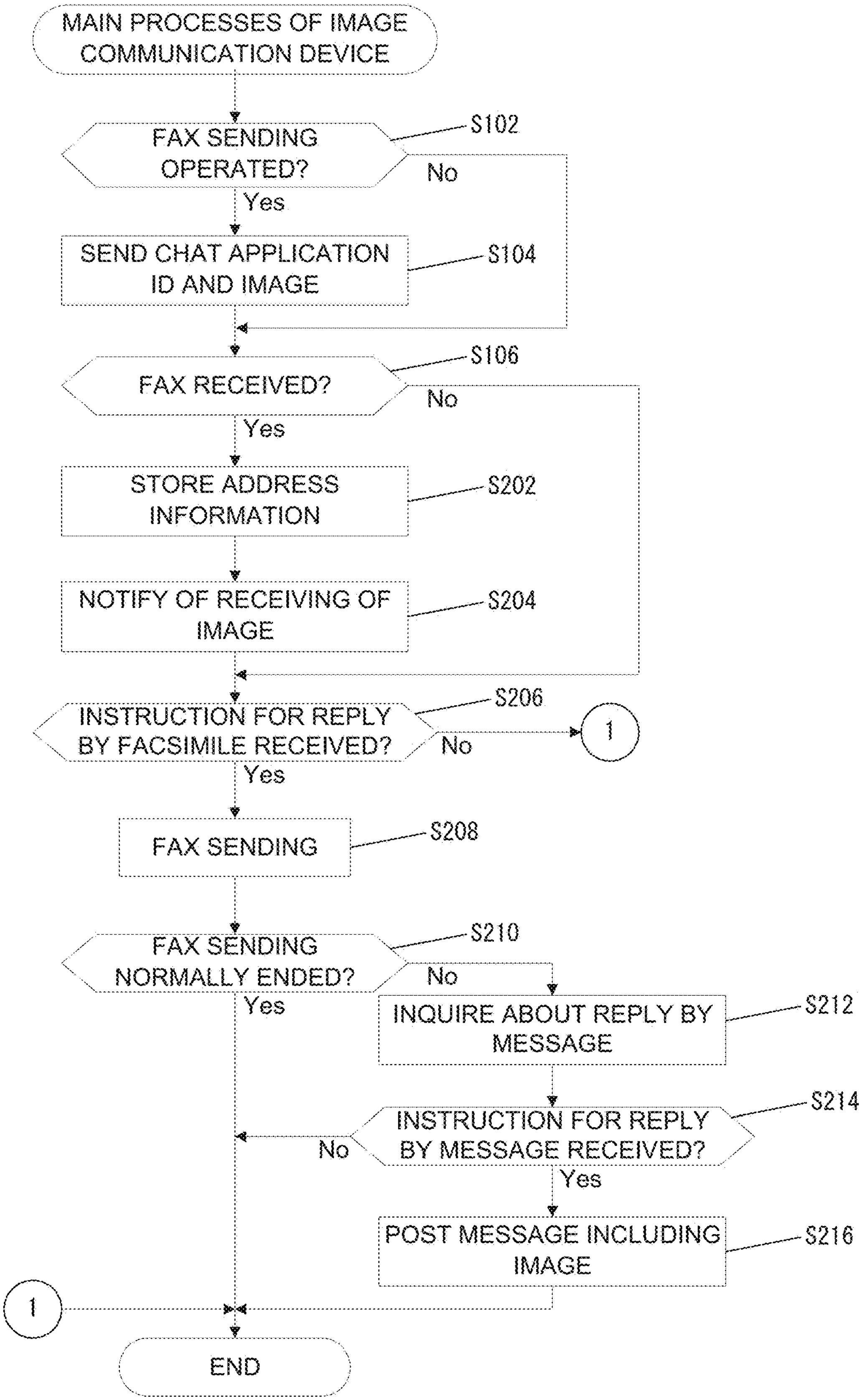
FIG. 13 is a flow chart for illustrating the flow of processes of an image communication device according to the second embodiment.

When the present embodiment is applied to the second embodiment, upon receiving, in step S206 of FIG. 13, the user's instruction for reply by facsimile, the controller 300 of the image communication device 30 determines whether or not the chat application ID of the second user is stored in the address information storage area 376. When the chat application ID of the second user is stored, the message post 310 posts, from the image communication device 30 to the first user, a message that allows the first user to select a reply method of either executing a reply by facsimile or executing a reply by message.

When the first user selects the reply by facsimile, the controller 300 executes the process of step S208 in FIG. 13. Meanwhile, when the user selects the reply by message, the controller 300 executes the step S216 in FIG. 13.

According to the present embodiment, when replying to the received image, the user can reply by message when the user does not wish to reply by facsimile.

4. Fourth Embodiment

Next, a fourth embodiment will be described. The fourth embodiment is an embodiment in which a user who, in a chat application, makes a reply of accepting can select whether or not to reply using the chat application, without instructing the image communication device to send a fax. Although the present embodiment can be applied to any of the first and second embodiments, the case of applying to the first embodiment will be described. In the description of the present embodiment, the user who received the received image is defined as the first user, and the user who sent the received image is defined as the second user.

According to the present embodiment, after step S126 in FIG. 8, the controller 100 determines whether or not the chat application ID of the second user is stored in the address information storage area 176. When the chat application ID of the second user is stored in the address information storage area 176, the controller 100 (the link processor 104) further posts, from the server device 10 to the first user, a message that allows the user to select whether or not to make a reply by message.

When it is selected that the reply is to be executed by message, the controller 100 of the server device 10 executes the process of posting a message including a reply image (step S140 in FIG. 8). When it is not selected that the reply is to be executed by message, the controller 100 (the link processor 104) may post, from the server device 10 to the first user, a message that allows the user to select whether or not to make the reply by facsimile. Based on the selecting by the user, the controller 100 may execute the process of sending the reply image by the facsimile communication.

Figure 15:
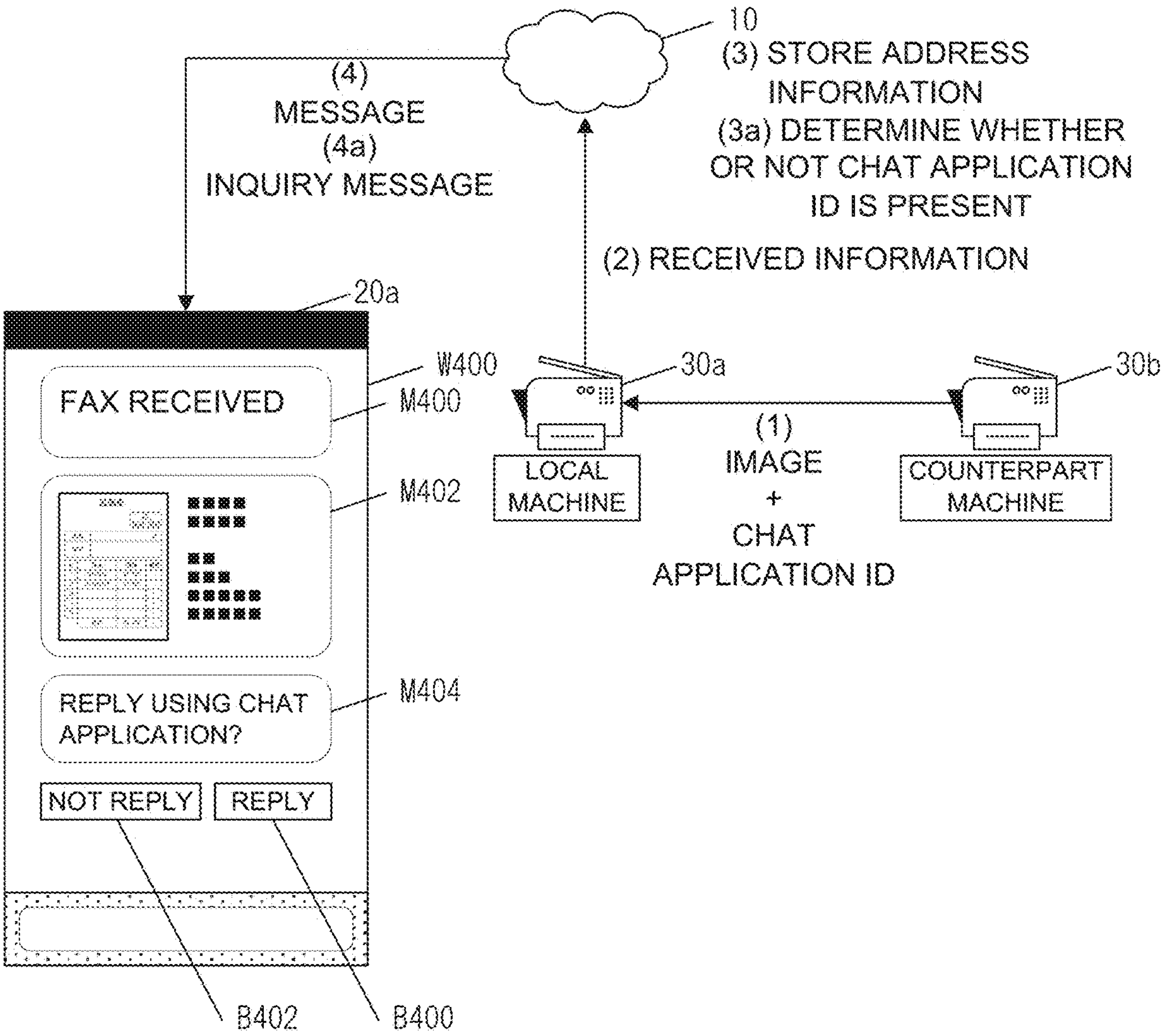
FIG. 15 is a diagram showing an operation example according to a fourth embodiment.

With reference to FIG. 15, an operation example according to the present embodiment will be described. After storing the address information, the server device 10 determines whether or not the chat application ID of the second user is stored in the address information storage area 176 ((3*a*) of FIG. 15). When the chat application ID is stored, the server device 10 posts, from the server device 10 to the first user, a message that shows that the process of fax receiving has been executed ((4) in FIG. 15), and a message inquiring whether or not to reply by message ((4*a*) in FIG. 15).

A display screen W400 shown in FIG. 15 is a diagram showing a timeline displayed on the terminal device 20*a* used by the first user. The display screen W400 of FIG. 15 shows messages M400 and M402 showing that the process of fax receiving has been executed, and a message M404 inquiring whether or not to reply by message. Further, the timeline displays a button B400 showing that the reply by message is to be executed and a button B402 showing that no reply by message is to be executed. When the button B400 is selected by the user, the server device 10 posts, with the second user as the destination, a message to which the reply image is attached.

When the present embodiment is applied to the second embodiment, the controller 300 of the image communication device 32, after storing the address information, may determine whether or not the chat application ID of the second user is stored in the address information storage area 376. When the chat application ID of the second user is stored, the controller 300 posts, with the first user as the destination, a message inquiring whether or not to send the reply by message. Based on the selecting by the user, the controller 300 may send a reply using a message or a facsimile communication.

According to the present embodiment, the user, after confirming the message showing that the image has been received, can make an instruction for reply by message, as is.

5. Fifth Embodiment

Next, a fifth embodiment will be described. The fifth embodiment is an embodiment in which when a reply of accepting is made by using the chat application (message), the user, for next time making a reply of accepting, can automatically make a reply of accepting, by using the chat application. In the description of the present embodiment, the user who received the received image is defined as the first user, and the user who sent the received image is defined as the second user.

The present embodiment can be applied to any of the first and second embodiments. According to the present embodiment, any of the server device 10, the terminal device 20, and the image communication device 32 stores the information showing whether or not the user has made an instruction for reply by message, and executes the processes shown below.

(1) When the controller 100 (link processor 104) of the server device 10 has received the received information from the image communication device 32, the controller 100 (link processor 104) further determines whether or not the information showing that the user has made an instruction for reply by message is stored. When the information showing that the user has made an instruction for reply by message is stored, the controller 100 (the link processor 104) posts, from the server device 10 to the second user, the message including the reply image. Further, the controller 100 (the link processor 104) posts, from the server device 10 to the first user, the message that shows that the reply by message has been executed.

(2) When the controller 100 of the terminal device 20 receives the message notifying of the receiving of the image, the controller 100 further determines whether or not the information showing that the user has made an instruction for reply by message is stored. When the information showing that the user has made the instruction for reply by message is stored, the controller 100 sends, to the server device 10, the instruction for reply by message. Further, the controller 100 (timeline display controller 206) displays, on the timeline, a message showing that a reply by message has been executed.

(3) When having executed the process of fax receiving, the image communication device 32 determines whether or not the information, which shows that an instruction for reply by message was made by the user who uses the image communication device 32 that received the image, is stored. When the information showing that the user has made an instruction for reply by message is stored, the controller 300 (message post 310) posts, from the image communication device 32 to the second user, a message including a reply image. Further, the controller 300 (message post 310) posts, from the image communication device 32 to the first user, a message that shows that reply by message has been executed.

With the above processes executed, the message including the reply image is acquired and displayed by the terminal device 20*b* used by the second user. Further, the terminal device 20*a* used by the first user acquires and displays the message showing that the message including the reply image has been posted.

Figure 16:
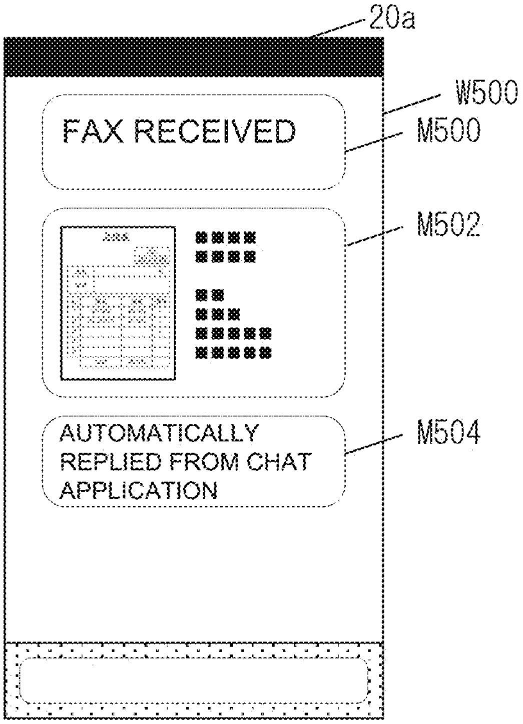
FIG. 16 is a diagram showing an operation example according to a fifth embodiment.

With reference to FIG. 16, an operation example according to the present embodiment will be described. A display screen W500 shown in FIG. 16 is a diagram showing a timeline displayed on the terminal device 20*a* used by the first user. Suppose that the first user, by using the chat application, had previously made a reply of accepting.

The display screen W500 of FIG. 16 shows messages M500 and M502 showing that the process of fax receiving has been executed, and a message M504 showing that a reply of accepting has been executed using the automatic chat application. By checking the message M504, the user can confirm that the reply by message has been executed.

It may be settable by the user whether or not to automatically make a reply of accepting using the chat application (message).

According to the present embodiment, the user does not need to make an operation to reply by message, but can automatically reply by message.

6. Sixth Embodiment

Next, a sixth embodiment will be described. The sixth embodiment is an embodiment that makes it possible to notify the user, who sent the image, of additional information such as service information. Although the present embodiment can be applied to any of the first and second embodiments, the case of applying to the first embodiment will be described. In the description of the present embodiment, the user who received the received image is defined as the first user, and the user who sent the received image is defined as the second user.

According to the present embodiment, for each user using the link service, the server device 10 stores, in the storage 170, a setting (service information notification) showing whether or not to send a message, which includes the service information, to the user who sent the image, and also stores the contents to be notified.

After sending the reply to the second user, the controller 100 determines whether or not the first user has turned on the service information notification, and whether or not the chat application ID of the second user is stored in the address information storage area 176.

When the service information notification of the first user is on and the chat application ID of the second user is stored in the address information storage area 176, the server device 10 allows the first user to select whether or not to notify the second user of the service information. Specifically, the controller 100 (the link processor 104) posts, from the server device 10 to the first user, a message which inquires whether or not to notify of the service information. When notifying of the service information is selected by the first user, the controller 100 (the link processor 104) posts, from the server device 10 to the second user, a message which includes the service information. As a message including a reply image, the message which includes the service information is acquired and displayed by the terminal device 20*b* used by the second user.

With the above processes, the second user's chat application ID sent and received using the facsimile communication can be used for sending of the service information other than for replying.

Figure 17:
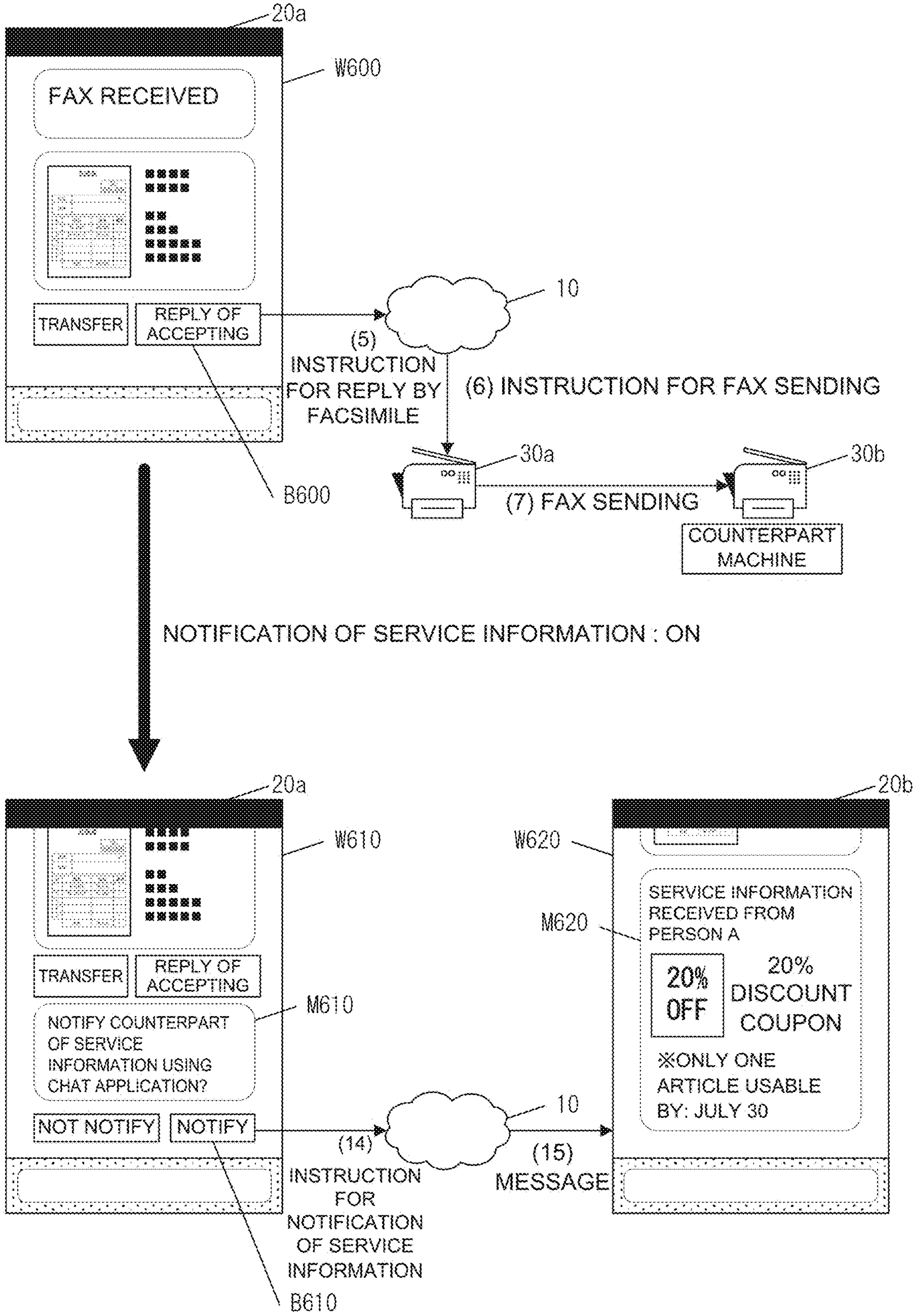
FIG. 17 is a diagram showing an operation example according to a sixth embodiment.

With reference to FIG. 17, an operation example according to the present embodiment will be described. A display screen W600 shown in FIG. 17 is a diagram showing a timeline displayed on the terminal device 20*a* used by the first user. In the display screen W600 of FIG. 17, a button B600 making an instruction to reply by message is displayed, and with the button B600 selected by the user, a reply to the second user is executed ((5) to (7) of FIG. 17).

In the server device 10, when setting of the service information notification is on and the chat application ID of the second user is stored, a message M610 for selecting whether or not to notify of the service information is displayed on the timeline, as shown in the display screen W610 of FIG. 17. When the button B610 showing the notifying of the service information is selected by the first user, an instruction for notifying of the service information is sent from the terminal device 20*a* to the server device 10 ((14) in FIG. 17).

When the server device 10 has received the instruction for notifying of the service information, the server device 10 posts, from the server device 10 to the second user, a message which includes the service information. As a message including a reply image, the message is acquired and displayed by the terminal device 20*b* used by the second user ((15) in FIG. 17).

For example, as shown in a display screen W620 in FIG. 17, the message M620 including the service information is displayed on the timeline, in the display 240 of the terminal device 20*b* used by the second user. The second user can know the service information by checking the message M620.

Without allowing the first user to select whether or not to send the service information, the service information may be automatically notified to the second user when the service information notification is ON.

In the chat application, the second user may be able to set whether or not to receive service information, etc. notified from the first user.

According to the present embodiment, the first user, by using the chat application ID of the second user, can execute notifying of any predetermined information, other than replying.

7. Modified Example

The present invention is not limited to each of the above embodiments, and various modifications can be made therefor. That is, any embodiment acquired by combining technical measures appropriately modified in the scope not departing from the gist of the present invention is also included in the technical scope of the present invention.

Further, while the above embodiments have parts described separate from each other for convenience of description, it is needless to say that the embodiments may be combined and executed within the technically possible range.

Further, the program that operates in each device according to the embodiment is a program that controls the CPU or the like so as to realize the functions of the embodiments described above (a program that makes a computer function). Then, the information handled by these devices is temporarily stored in a temporary storage device (for example, RAM) at the time of processing the information, and then is stored in various storage devices such as a ROM (Read Only Storage) and an HDD, and, as needed, is read, corrected, and written by the CPU.

Here, examples of a recording medium for storing the program may include a semiconductor medium (such as a ROM and a non-volatile storage card), an optical recording medium/magneto-optical recording medium (such as a digital versatile disc (DVD), a magneto optical disc (MO), a mini disc (MD), a compact disc (CD), and a Blu-ray (registered trademark) disc (BD)), and a magnetic recording medium (such as a magnetic tape and a flexible disk). Further, not only that the functions of the above embodiments are realized by executing the loaded program, as the case may be, the functions of the present invention are realized by processing in coordination with the operating system or any other application program, based on an instruction of the program.

Further, in the case of distribution to the market, the program can be stored in a portable recording medium and distributed, or transferred to a server computer connected via a network such as the Internet. In this case, of course, the storage device of the server computer is also included in the present invention.

What is claimed is:

1. A control method of a system in which a server device, a first communication device, a second communication device, a first terminal device, and a second terminal device are connected and communicate with each other, the control method comprising:

in a case that the first communication device receives a first image from the second communication device:

sending predetermined information from the first communication device to the first terminal device through the server device;

sending a first instruction from the first terminal device to the first communication device, the first instruction indicating that a second image should be sent to the second communication device;

sending the second image from the first communication device to the second communication device based on the first instruction;

sending a second instruction from the first terminal device to the first communication device, the second instruction indicating that a message, input by a user, should be sent to the second terminal device; and sending the message from the first communication device to the second terminal device based on the second instruction, wherein the first instruction and the second instruction are executed based on one or more operations performed by the user, the one or more operations received via a user interface of a first application executed on the first terminal device.

2. The control method according to claim 1, wherein:

the first communication device receives the first image from the second communication device by using a first communication method, the first communication device sends the second image to the second communication device by using the first communication method, and the message is sent to the second terminal device by using a second communication method different from the first communication method.

* * * * *